(12) United States Patent
Abrol et al.

(10) Patent No.: US 8,965,974 B2
(45) Date of Patent: Feb. 24, 2015

(54) SYSTEMS AND METHODS FOR DETERMINING USER ATTRIBUTE VALUES BY MINING USER NETWORK DATA AND INFORMATION

(75) Inventors: Satyen Abrol, Richardson, TX (US); Vaibhav Khadilkar, Dallas, TX (US); Latifur Rahman Khan, Plano, TX (US); Bhavani Marienne Thuraisingham, Dallas, TX (US)

(73) Assignee: Board of Regents, The University of Texas System, Austin, TX (US)

( * ) Notice: Subject to any disclaimer, the term of this patent is extended or adjusted under 35 U.S.C. 154(b) by 204 days.

(21) Appl. No.: 13/588,977

(22) Filed: Aug. 17, 2012

(65) Prior Publication Data

US 2013/0218965 A1 Aug. 22, 2013

Related U.S. Application Data

(60) Provisional application No. 61/525,614, filed on Aug. 19, 2011.

(51) Int. Cl.
*G06F 15/16* (2006.01)
*H04L 29/08* (2006.01)

(52) U.S. Cl.
CPC .......... *H04L 29/08936* (2013.01); *H04L 67/22* (2013.01); *H04L 67/306* (2013.01); *H04L 67/18* (2013.01)
USPC ...................................................... 709/204

(58) Field of Classification Search
CPC ... H04L 67/22; H04L 29/08936; H04L 67/18; H04L 67/306

USPC ......................................................... 709/204
See application file for complete search history.

(56) References Cited

U.S. PATENT DOCUMENTS

| | | | |
|---|---|---|---|
| 2008/0005096 A1* | 1/2008 | Moore | 707/5 |
| 2009/0070412 A1* | 3/2009 | D'Angelo et al. | 709/203 |
| 2011/0113098 A1* | 5/2011 | Walsh et al. | 709/204 |
| 2012/0015746 A1* | 1/2012 | Mooney et al. | 463/42 |
| 2012/0163770 A1* | 6/2012 | Kaiser et al. | 386/241 |
| 2012/0239466 A1* | 9/2012 | Hu et al. | 705/14.1 |
| 2012/0264520 A1* | 10/2012 | Marsland et al. | 463/42 |
| 2013/0006734 A1* | 1/2013 | Ocko et al. | 705/14.12 |
| 2014/0245382 A1* | 8/2014 | Pannu et al. | 726/1 |
| 2014/0250117 A1* | 9/2014 | Behforooz et al. | 707/728 |

OTHER PUBLICATIONS

ABI Research. Retrieved Aug. 29, 2012, from http://www.abiresearch.com.

(Continued)

*Primary Examiner* — Ebrahim Golabbakhsh
(74) *Attorney, Agent, or Firm* — Thomas | Horstemeyer, LLP

(57) ABSTRACT

Systems and methods for determining one or more attributes and their associated values for a user, by mining the user's social network profiles. The systems and methods determine if the value of an attribute of interest for a user is specified on one or more social networking websites. If so, the systems and methods set the attribute value for the user to the specified attribute value. If not, the systems and methods retrieve, from the social networking websites, attribute values for the attribute of interest for friends of the user to form a group of possible attribute values for the user. The method, selects a value from the group of possible attribute values, and then sets the selected value as the attribute value for the user.

20 Claims, 15 Drawing Sheets

(56) References Cited

OTHER PUBLICATIONS

Socialnomics. Social Media Blog. Retreived Aug. 29, 2012, from http://www.socialnomics.net.

Time in Partnership with CNN. Iran Protests: Twitter, the Medium of the Movement. Retrieved Aug. 29, 2012, from http://www.time.com/time/world/article/0,8599,1905125,00.html.

SourceForge. CRFTagger: CRF English POS Tagger. Retrieved Aug. 29, 2012, from http://sourceforge.net/projects/crftagger/.

United States Census Bureau. Tiger Products. Retrieved Aug. 29, 2012, from http://www.census.gov/geo/www/tiger/.

Huifeng Li, Rohini K. Srihari, Cheng Niu, and Wei Li. Location normalization for information extraction. In Proceedings of the 19th International Conference on Computational Linguistics, p. 1-7, Taipei, Taiwan, Aug. 24-Sep. 1, 2002.

E. Amitay, N. Har'El, R. Sivan, and A. Soffer. Web-a-Where:Geotagging Web Content. In Proceedings of the 27th Annual International ACM SIGIR Conference on Research and Development in Information Retrieval, p. 273-280, Sheffield, United Kingdom, Jul. 25-29, 2004.

Andrew Mehler, Yunfan Bao, Xin Li, Yue Wang, and Steven Skiena. Spatial Analysis of News Sources. In IEEE Transactions on Visualization and Computer Graphics, vol. 12, Issue 5, p. 765-772, Sep./Oct. 2006.

Jiahui Liu and Larry Birnbaum. Localsavvy: Aggregating Local Points of View About News Issues. In Proceedings of the First International Workshop on Location and the Web, p. 33-40, Beijing, China, Apr. 22, 2008.

Chang Sheng, Wynne Hsu, and Mong Li Lee. Discovering Geographical Specific Interests From Web Click Data. In Proceedings of the First International Workshop on Location and the Web, p. 41-48, Beijing, China, Apr. 22, 2008.

Michael D. Lieberman, Hanan Samet, and Jagan Sankaranarayanan. Geotagging: Using Proximity, Sibling, and Prominence Clues to Understand Comma Groups. In Proceedings of the 6th Workshop on Geographic Information Retrieval, Zurich, Switzerland, Feb. 18-19, 2010.

Satyen Abrol and Latifur Khan. TWinner: Understanding News Queries With Geo-Content Using Twitter. In Proceedings of the 6th Workshop on Geographic Information Retrieval, Zurich, Switzerland, Feb. 18-19, 2010.

\* cited by examiner

PROCESS 1: LOCATION_IDENTIFICATION (USER_MESSAGES)

INPUT: UM: ALL MESSAGES OF USER
OUTPUT: VECTOR (C,S): CONCEPTS AND SCORE VECTOR

1: FOR EACH KEYWORD, $K_i$      //PHASE 1
2:     FOR EACH $C_j \in K_i$      //$C_j$ – LOCATION CONCEPT
3:        FOR EACH $T_f \in C_j$      //Tf - Term
4:           TYPE = TYPE($T_f$)
5.             IF ($T_f$ OCCURS IN UM) THEN $S_{C_j} = S_{C_j} + S_{type}$
6. FOR EACH $K_i$      //PHASE 2
7.     FOR EACH $C_j \in K_i$
8.        FOR $T_f \in C_j$, $T_s \in C_l$
9.           IF ($T_f = T_s$) AND $C_j \neq C_l$ THEN
10.             TYPE = TYPE($T_f$)
11.             $S_{C_j} = S_{C_j} + S_{type}$
12. RETURN (C,S)

FIG. 3

PROCESS 2: SIMPLE_MAJORITY (USERID, DEPTH)

---

INPUT: USER ID OF THE USER AND THE CURRENT DEPTH
OUTPUT: LOCATION OF THE USER

1: IF (TWITTER_LOCATION (USERID)! =*NULL*)
2:     THEN RETURN TWITTER_LOCATION (USERID)
3: ELSE IF (DEPTH=0)
4:     THEN RETURN *NULL*;
5. ELSE {
6.     ALL_FRIENDS [] = GET_FRIENDS (USERID);
7.     FOR EACH FRIEND ALL_FRIENDS [i]
8.         LOCATION [i] = SIMPLE_MAJORITY (ALL_FRIENDS [i],DEPTH-1);
9.     AGGREGATE (LOCATION [ ]);   //AGGREGATE SCORES FOR EACH LOCATION
10.    BOOST (LOCATION [ ]);   //ADD GENERAL CONCEPT SCORES TO SPECIFIC CONCEPT SCORES
11.    RETURN MAX_LOCATION (LOCATION [ ] );   //RETURN ONLY LOCATION WITH THE MAXIMUM SCORE
12     }

FIG. 4

PROCESS 3: CLOSENESS (USERID, FRIENDID)

---

INPUT: USER ID OF THE USER AND USER ID OF THE FRIEND
OUTPUT: CF, THE *CLOSENESS* BETWEEN THE USER AND THE FRIEND

1: CF=0                                         //INITIALIZE
2: ALL_FRIENDS1 [ ] = GET_FRIENDS (USERID);
3: ALL_FRIENDS2 [ ] = GET_FRIENDS (FRIENDID);
4. CF = COMMON_FRIENDS (ALL_FRIENDS1 [ ], ALL_FRIENDS2 [ ]);
5. IF SR >$N_{SPAMMER}$              //SR - SPAM RATIO
6.         THEN CF = 0
7. IF (FOLLOWERS (FRIENDID) > $N_{CELEBRITY}$) THEN
8.         CF = CF * (|ALL_FRIENDS1|/FOLLOWERS(FRIENDID))
9. RETURN CF;

FIG. 5

PROCESS 4: k_CLOSEST_FRIENDS (USERID, DEPTH)

INPUT:   USER ID OF THE USER AND THE CURRENT DEPTH
OUTPUT:  LOCATION OF THE USER

1: IF (TWITTER_LOCATION (USERID)! =NULL)
2:      THEN RETURN TWITTER_LOCATION (USERID);
3: ELSE IF (DEPTH=0)
4:      THEN RETURN NULL;
5. ELSE {
6.      ALL_FRIENDS [] = GET_FRIENDS (USERID);
7.      k_CLOSEFRIENDS [ ] [2] = k-CF (USERID, ALL_FRIENDS [ ] ,k);
8.      FOR EACH FRIEND k_CLOSEFRIENDS [i] [ ]
9.           LOCATION [i] [1] = k_CLOSEST_FRIENDS
             (k_CLOSEFRIENDS [i], DEPTH-1);
10.          LOCATION [i] [2] = k_CLOSEFRIENDS [i][2];
11.     AGGREGATE (LOCATION [ ][ ])
12.     BOOST (LOCATION [ ][ ]);
13.     RETURN MAX_LOCATION (LOCATION [ ][ ] );
14.  }

FIG. 6

PROCESS 5: FUZZY_k_CLOSEST_FRIENDS (USERID, DEPTH)
_____

INPUT:    USER ID OF THE USER AND THE CURRENT DEPTH
OUTPUT:   LOCATION VECTOR OF THE USER

1:  IF (TWITTER_LOCATION (USERID)! =*NULL*)
2:          THEN RETURN [TWITTER_LOCATION (USERID), 1.0];
3:  ELSE IF (DEPTH=0)
4.          THEN RETURN [*NULL*, 1.0];
5.  ELSE {
6.          ALL_FRIENDS [] = GET_FRIENDS (USERID);
7.          k_CLOSEFRIENDS [ ] [2] = k-CF (USERID, ALL_FRIENDS [ ] ,k);
8.          FOR EACH FRIEND k_CLOSEFRIENDS [i] [ ]
9.              LOCATION [i] [1] = k_CLOSEST_FRIENDS
              (k_CLOSEFRIENDS [i], DEPTH-1);
10.             LOCATION [i] [2] = k_CLOSEFRIENDS [i][2];
11.         AGGREGATE (LOCATION [ ][ ])
12.         BOOST (LOCATION [ ][ ]);
13.         RETURN (LOCATION [ ][ ]);
14.     }

FIG. 7

SYSTEMS AND METHODS FOR DETERMINING USER ATTRIBUTE VALUES BY MINING USER NETWORK DATA AND INFORMATION

CROSS-REFERENCE TO RELATED APPLICATIONS

This application claims the benefit of U.S. Provisional Application No. 61/525,614 filed Aug. 19, 2011, which is hereby incorporated by reference.

STATEMENT REGARDING FEDERALLY SUPPORTED RESEARCH

This invention was made with government support under Grant No. HM1582-07-2035 awarded by the National Geospatial Intelligence Agency. The government has certain rights in the invention.

TECHNICAL FIELD

The illustrative embodiments relate generally to data mining, and more particularly, to determining one or more attributes and their associated values for a user by mining the user's social network profiles.

BACKGROUND

Online Social Networks (OSNs) represent an online community of Internet users. Depending on the website in question, many of these online community members share common interests in, for example, hobbies, religion, politics, etc. Online social networks such as Twitter, Foursquare, and Facebook have emerged only during the last decade and have since become popular tools for public discourse as well as political and social commentary. Other social networks, such as LinkedIn, also focus on business and professional networking.

As the popularity of social networking is on the rise, new uses for the technology are constantly being unearthed. At the forefront of emerging trends on social networking websites is the concept of "real time" and "location based" searches. However, mining attributes such as the location of a user is not an easy task in itself. For instance, traditional text-based location extraction techniques often do not perform well in the domain of social networks. A reason for the abridged performance is the presence of multiple locations within the text, which makes it difficult to identify a single location for the user. Additionally, there is often a lack of relationship between the location of the user and the location mentioned in the text. Thus, there is a need for a solution to these limitations, as well as others, in existing techniques.

SUMMARY

According to an illustrative embodiment, a method in a data processing system for determining a value of an attribute of a user comprises determining if a value of an attribute of interest for a user is specified on one or more social networking websites. Responsive to a determination that the value of an attribute of the user is not specified, the process retrieves, from the one or more social networking websites, attribute values for the attribute of interest for friends of the user to form a group of possible attribute values for the user. The process then selects a value from the group of possible attribute values, and sets the selected value as the attribute value for the user.

According to another illustrative embodiment, a method in a data processing system for determining a location of a user comprises extracting text from messages provided by a user on a social networking website, wherein the messages include one or more location concepts. The process removes words unrelated to geographical locations from the text. The process assigns a weight to each location concept based on the occurrence of the location concept in the text, wherein specific location concepts are assigned a greater weight compared to general location concepts. Responsive to determining a correlation between a specific location concept and a general location concept, the process adds the weight of the general location concept to the specific location concept. The process then reorders the location concepts in descending order of weights, and assigns a probability score (S) to each location concept (C) based on its individual weight. Based on the probability scores, the process assigns a location concept to the user.

According to another illustrative embodiment, an apparatus for determining a value of an attribute of a user comprises a bus, a storage device connected to the bus, wherein the storage device contains computer usable code, and a processing unit connected to the bus, wherein the processing unit executes the computer usable code to determine if a value of an attribute of interest for a user is specified on one or more social networking websites. The processing unit executes the computer usable code to retrieve, from the social networking websites, attribute values for the attribute of interest for friends of the user to form a group of possible attribute values for the user in response to a determination that the value of an attribute of the user is not specified. The processing unit further executes the computer usable code to select a value from the group of possible attribute values, and sets the selected value as the attribute value for the user.

BRIEF DESCRIPTION OF THE DRAWINGS

FIG. 3 is example code for a gazetteer-based location determination process using messages posted to a social network in accordance with an illustrative embodiment;

FIG. 4 is example code for a location determination process based on a simple majority of the locations of a user's friends on a social network in accordance with an illustrative embodiment;

FIG. 5 is example code for determining closeness between users on a social network in accordance with an illustrative embodiment;

FIG. 6 is example code for a location determination process that uses locations of a user's closest friends on a social network in accordance with an illustrative embodiment;

FIG. 7 is example code for determining a location of a user along with an associated, confidence level using locations of the closest, friends in a user's social network in accordance with an illustrative embodiment;

DETAILED DESCRIPTION

In the following detailed description of the illustrative embodiments, reference is made to the accompanying drawings that form a part hereof. These embodiments are described in sufficient detail to enable those skilled in the art to practice the invention, and it is understood that other embodiments may be utilized and that logical structural, mechanical, electrical, and chemical changes may be made without departing from the spirit or scope of the invention. To avoid details not necessary to enable those skilled in the art to practice the embodiments described herein, the description may omit certain information known to those skilled in the art. The following detailed description is, therefore, not to be taken in a limiting sense.

Figure 1:
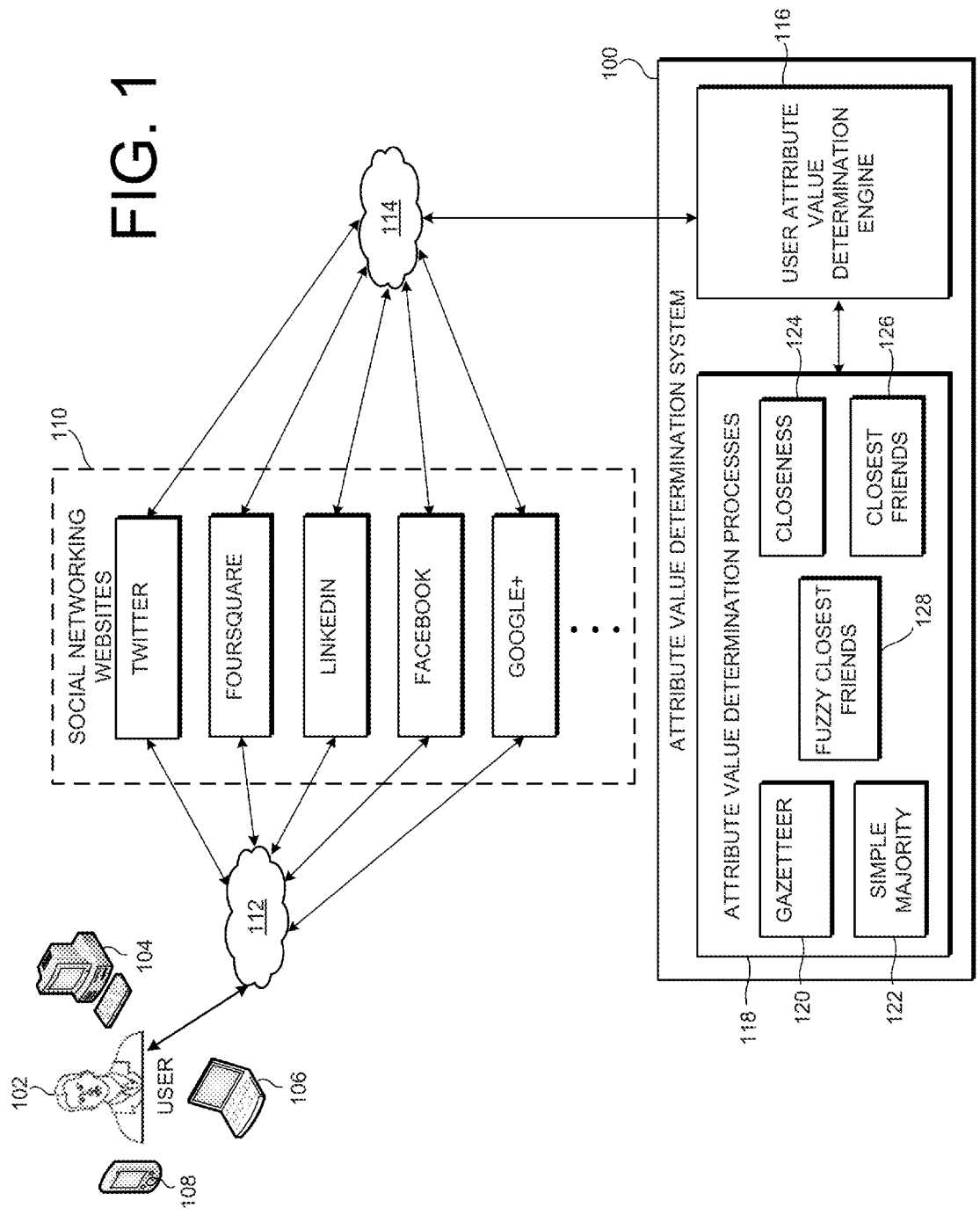
FIG. 1 is a schematic, block diagram of a system for determining the value of an attribute of a user by mining the user's social network profiles in accordance with an illustrative embodiment.

FIG. 1 is a schematic, block diagram of a system for determining the value of an attribute of a user 102 by mining the user's social network profiles in accordance with an illustrative embodiment. In one example, the user's social network profiles may be publicly available. Attribute values for the user 102 may be determined based on the user's social network profiles using highly efficient processes that ensure high accuracy and low time complexity. In one illustrative embodiment, user 102 may interact with a social networking website using a data processing device, such as a desktop 104, laptop 106, mobile phone 108, or other Internet communication device. The user 102 may provide information to each social networking website utilized by the user 102. This information, explicitly provided by the user, may be stored as a user profile on each social networking website. The information may comprise attributes about the user, such as the user's gender, age, ethnicity, interests, location, etc. It should be noted that user 102 may comprise an individual or a group of individuals, such as an organization or company.

The user 102 may connect with one or more social networking websites 110 via network 112. The techniques, technologies, or media by which components of the system in FIG. 1 may intercommunicate are numerous. For example, the system in FIG. 1, or any portion thereof, may be part of a personal area network (PAN), a local area network (LAN), a campus area network (CAN), a metropolitan area network (MAN), or any other network type. Also, communication between any two elements of the system may be direct or indirect. For example, the data communication medium 112 between the user 102 and the social networking websites 110 may be any medium through which data can be communicated. For example, the data communication medium may be wired or wireless data connections, and may utilize a virtual private network (VPN), multi-protocol label switching (MPLS), the Internet, or any other data communication media. Wireless communication may utilize any wireless standard for communicating data, such as CDMA (e.g., cdmaOne or CDMA2000), GSM, 3G, 4G, Edge, an over-the-air network, Bluetooth, etc. Any of the transactions occurring in the system may be performed using secure SSL transactions.

In one example, the system in FIG. 1 may utilize the Internet, with any combination of the data communication media 112, 114 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational, and other computer systems that, route data and messages. FIG. 1 is intended as an example, and not as an architectural limitation for the different illustrative embodiments.

In this particular example, social networking websites 110 include Twitter, Foursquare, LinkedIn, Facebook, Google+, among others. The social networking websites 110 utilized by the user 102 may comprise any Internet website that enables user 102 to connect with other users to talk, share ideas, interests, music, data, and/or other information. Any social networking website may be used in the illustrative embodiments. For example, social networking websites like Twitter, Foursquare, LinkedIn, Facebook, Google+, etc. enable user 102 to communicate with friends, family, and followers/subscribers around the world, as well as make new connections with unknown people based on similar interests or professions.

As user 102 provides his/her information to one or more of the social networking websites 110, user attribute value determination engine 116 may extract this information to identify or predict attribute values for the user 102. In one embodiment, user attribute value determination engine 116 may comprise part of an attribute value determination system 100. User attribute value determination engine lib may access the user's social networking website profiles HQ via network 114 to mine attribute information. In one embodiment, user attribute value determination engine 116 may extract an identifier of the user (userId) from a social networking website. A userId is a unique identifier for each user on a social networking website (e.g., Twitter uses a Twitterid of https://twitter.com/userid). Once a userId is obtained for a user from a social networking website, an application programming interface (API) may be used, to obtain other information (messages, name, friends, location, etc.) from the website using the userId. As the user attribute information may be part of the user's profile, this information may be publicly available for viewing by others, although it should be noted that aspects of the embodiments may also be used, for private user profiles as well. This information may be retrievable if the user has provided the information and if the information is public or otherwise visible to the user attribute value determination engine 116.

User attribute value determination engine 116 may utilize one or more attribute value determination processes 118 to extract attribute information about the user from their social networking website profiles 110. If attribute information is not available for the user 102 (e.g., the user has not explicitly provided attribute information), the user attribute value determination engine 116 may also employ the attribute value determination processes 118 to extract attribute information about friends of the user 102, and then assign the user 102 an attribute value based on the friends' attribute information. In this manner, the user 102 may be assigned an attribute value based on the values of the attribute for the user's social connections.

Consider the following example in which the user attribute value determination engine 116 may identify an explicitly-specified or an implicitly-determined attribute value for the user 102 by calling one or more of the processes 118. For instance, if one wants to know the geographical location of the user 102, the user attribute value determination engine 116 may call a particular location determination process which first determines whether the user has explicitly provided the user's location in the attributes or profiles stored by one of the social networking websites 110. If the user has explicitly provided his/her location, the process may end, as the user's location has been determined. However, if the user has not explicitly provided his/her location in the profiles, the user attribute value determination engine lib may examine the location values provided by the user's social connections (e.g., friends, friends of friends, etc.) in each of their profiles. The user attribute value determination engine 116 may extract the locations associated with the user's friends, or even locations associated with the user's friends of friends. The user attribute value determination engine 116 may then use the locations extracted from the user's friends to determine the probable or implicit location of the user. In this manner, the user attribute value determination engine 116 may determine an attribute value of user 102, even though the user 102 has not provided this attribute information on any of his/her social networking website profiles.

In this illustrative example, the attribute value determination system 100 is shown to comprise various attribute value determination processes 118, including a gazetteer process 120, a simple majority process 122, a closeness process 124, a closest friends process 126, and a fuzzy closest friends process 128. These processes are described in more detail in FIGS. 3-14 below. To determine and identify particular attribute values of the user 102, these processes may utilize data mining to extract attribute information provided to a social networking website by users. Attribute information for the user 102 may include, but is not limited to, location, age, age group, race/ethnicity, threat, languages spoken, religion, economic status, education level, gender, interests (e.g., cuisines, sports, politics, music, etc.), among others. For example, if the user 102 inputs the user's geographical location in the user's profile on the Twitter website, the illustrative embodiments may extract the user's location from this explicitly provided information (e.g., Dallas, Tex.). Similarly, if the user has input the user's bio to the user's profile on the Twitter website, the illustrative embodiments may extract the user's bio from this explicitly provided information.

Figure 2:
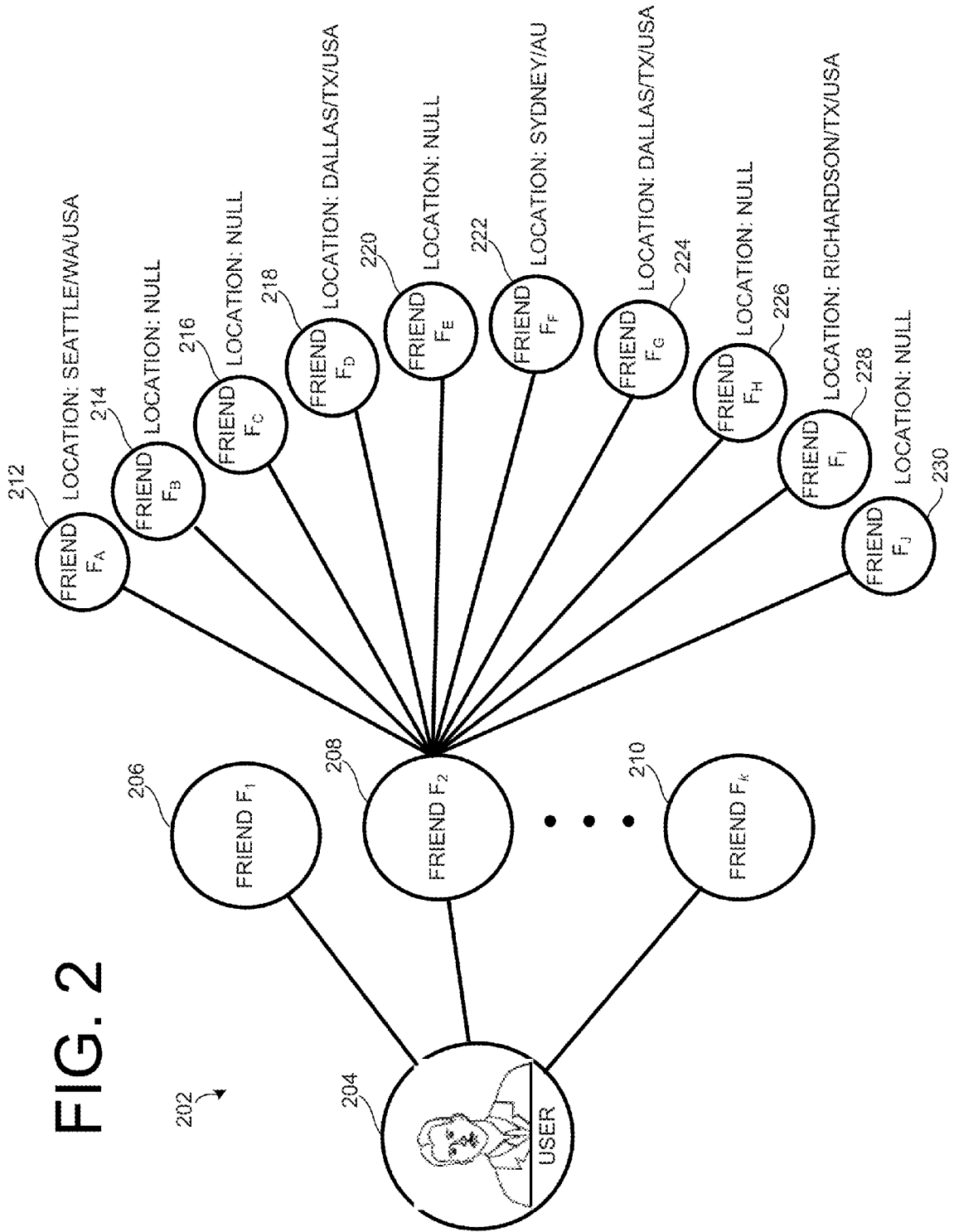
FIG. 2 is an example undirected graph with a depth=2 used to represent a social network of the user in accordance with an illustrative embodiment.

As previously mentioned, however, there may be situations where the user has not explicitly provided attribute information to the user's social networking websites. FIG. 2 illustrates a graph based approach (relying on the social graph of the user) towards determining the value of an attribute of a user. In particular, FIG. 2 is a sample undirected graph used to represent the social network of the user in accordance with an illustrative embodiment. Each node in the graph 202 represents a user, and each edge (line) represents friendship between two nodes. The root of the graph 202 represents the user 204 whose location is to be determined. The nodes connected to the user 204, friend $F_1$ 206, friend $F_2$ 208, . . . , friend $F_k$ 210, represent the k friends of user 204. Each friend of the user 204 can also have his or her own network; for example, friend $F_2$ 208 is shown to have a network comprising m friends, including friends $F_A$ through $F_J$ (212-230). This example graph has a depth=2, which means the social network to be searched may extend 2 levels from the root user node 204. However, the illustrative embodiment may utilize any number of depth levels (e.g., 1, 4, 8, 10, etc.) when determining attribute values for the user 204.

As the example graph of FIG. 2 shows, the illustrative embodiments may data mine profile information of a user's "friends" (e.g., people in the user's social networks) and extract attribute values for these friends to implicitly determine or predict an attribute value for the user 204. Thus, using the same location attribute example above, if the user of interest 204 has not provided his/her location information to the website, the illustrative embodiments may extract the location information of the user's social network friends (if provided in their respective user profiles). The "depth" of friends from which the location information is extracted may depend on the depth setting defined by the extraction process. In other words, if the process has a setting of depth=1, then the locations for only the friends immediately or directly connected to user 204 (e.g., friends $F_1$ to $F_k$) are extracted to determine the location of the user 204. Likewise, if the process has a setting of depth=2, then the locations for the friends immediately connected to the user 204 (e.g., $F_1$ through $F_k$) and those friends' immediate connections (e.g., friends of friends $F_A$ through $F_J$) are extracted. Based on the extracted location information of the user's social network, the illustrative embodiments may then assign or predict a location for the user 204.

Examples of location values that may be extracted from friends of user 204 are illustrated for friends of friends $F_A$ through $F_J$ (212-230). Similar to user 204 who may or may not have explicitly provided the user's location information to a social networking website, friends of friends $F_A$ through $F_J$ 212-230 may or may not have provided their respective location information to the social networking website. For example, $F_A$ 212 has provided an explicit location of Seattle, Wash., USA in his/her user profile for the social networking website. In contrast, $F_B$ 214 has not provided an explicit location to the social networking website, and thus his/her location shows a null value. The user attribute value determination engine 116 in FIG. 1 may extract all of these location values for the user's friends and determine an implicit location for the user 204 based on the extracted locations provided by his/her social network of friends.

FIG. 3 is example code for a gazetteer-based location determination process that uses social network messages in accordance with an illustrative embodiment, which may be implemented by the gazetteer process 120 of FIG. 1. This particular process may be called by the user attribute value determination engine 116 in FIG. 1 to determine a user's location by mining the messages of the user and the user's friends. The process, referred to as Location_Identification, comprises score based identification and disambiguation. In this particular illustrative example, the process shows location identification of a user on Twitter, although the process may be implemented on any social networking website or any combination of social networking websites.

Prior to running this Location_Identification process, the user attribute value determination engine 116 may preprocess the data extracted from a user's messages to remove all words from the messages that are not references to geographic locations. In one preprocessing embodiment, the CRF (Conditional Random Fields) Tagger may be used, which is an open source Part of Speech (POS) tagger for the English language with an accuracy of close to 97% and a tagging speed of 500 sentences per second. The CRF tagger may identify all of the proper nouns from the text and term them as keywords {K1, K2, . . . , Kn}. Subsequently, a gazetteer may be searched to identify geographic city names from among the keywords. One example gazetteer is the TIGER (Topologically Integrated Geographic Encoding and Referencing system) dataset, which is an open source gazetteer consisting of topological records and shape files with coordinates for cities, counties, zip codes, street segments, etc. for the entire United States.

The user attribute value determination engine 116 may search the gazetteer for location concepts $\{C_1, C_2, \ldots, C_n\}$ pertaining to each keyword. A location concept comprises a specified geographical location and is typically of the format {City} A/{State} B/{Country} C. The focus for each keyword is to pick out the right concept from the gazetteer list, such that a disambiguated location is obtained. A weight-based disambiguation method may be utilized in the process to perform the disambiguation. In phase 1 of the process, a weight may be assigned to each concept based on the occurrence of its terms in the text. For each location depending on the level of detail, any of A, B and/or C can be null. Specific or fine-grained concepts may be assigned a greater weight as compared to the more general concepts. For instance, a location concept of "Dallas" may be a more specific location concept as compared to a more general location concept of "Texas". "Type" in step 4 refers to the type of location like city, state, or country. Weight scores are assigned based on the type in step 5 ($S_{type}$).

In phase 2, the process may check for a correlation between concepts, in which one concept subsumes the other. $T_f$ and $T_s$ in step 8 are location concept terms. For example, if $C_j$ is Dallas/TX/USA, then $C_j$ has three terms Dallas, Tex., and USA. Similarly if $C_l$ is TX/USA, then $C_l$ has two terms TX and USA. Thus, for each of the terms in $C_j$ and $C_l$, it may be determined if there is any relationship between them. In such a case, the more specific or fine-grained concept may get a boosting from the more general concept. For example, if a more fine-grained concept $C_i$ is part of another concept $C_j$, then the weight of $C_j$ is added, to that of $C_i$. For example, city carries 15 points, state carries 10 points, and a country name carries 5 points. For the keyword "Dallas", consider the concept of {City}Dallas/{State} Texas/{Country} USA. The concept gets 15 points because Dallas is a city name, and it gets an additional 10 points if Texas is also mentioned in the text.

Thus, using the previous example, if {Dallas, Tex.} are the keywords appearing in the text, then among the various concepts listed for "Dallas" would be {City}Dallas/{State} Texas/{Country} USA, and one of the concepts for "Texas" would be {State} Texas/{Country} USA, Now, as phase 2 checks for such correlated concepts in which one concept subsumes the other, the more specific or fine-grained concept gets a boosting from the more general concept. Here, the above mentioned Texas concept boosts up the more fine-grained Dallas concept.

After the two phases are complete, the concepts may be re-ordered in descending order of their weights. Each concept (C) may then be assigned a probability score (S) depending on their individual weights, and the process may return these values. The probability score is used to indicate the likelihood of a location concept being the actual location of the user. The higher the probability score, the more likely the location concept is the location of the user. The concept having the highest probability score may then be selected and set as the location for the user.

FIG. 4 is example code for determining a location of a user based on a simple majority of the locations of the user's friends on a social networking website in accordance with an illustrative embodiment, which may be implemented by the simple majority process 122 of FIG. 1. This embodiment allows for determining the value of an attribute of a user by taking a simple majority of the attribute values of the user's friends (followers and following), and then assigning the majority value as the attribute value for the user. Since a majority of friends may not have an explicitly specified value for an attribute, the social network of the friend (and friends of friends, etc.) can be further explored. Although the process Simple_Majority (userId, depth) is illustrated as extracting the particular attribute of location from a user's Twitter network, it should be noted that the process is not limited to such, and may be applicable to any attribute provided on social networks (e.g. age, age group, etc.) as previously described, and is applicable to social networking websites other than Twitter.

Using the social network graph in FIG. 2 and a location attribute as am example, to explore the social network of a user's friend, if the location of a friend is not known, instead of labeling the friend's location as null, the Simple_Majority process may use the friend's friends in choosing the location for the user. For instance, if the location of friend $F_2$ is null, the process may examine the locations of the friends (e.g., $F_4$-$F_J$) of friend $F_2$. It is important to note here that each node in the graph has just one label (e.g., a single value for each location).

The process Simple_Majority(userId, depth) is divided into several steps as shown in FIG. 4. In steps 1 and 2, the explicitly specified location of the user is checked for, and if it is present, the node is given that location value. At step 3, if the process being called, recursively has reached a depth of 0 and is unable to find a location, the algorithm returns null to the calling-method. It is important to note here that the above two conditions specify the boundary conditions of the recursive function. If either of the two conditions is not met, then the location may be determined on the basis of the simple majority of the locations of the user's friends.

In step 6, a list of all friends of the user under scrutiny is obtained. Next, for each of the user's friends, the location is determined by recursively calling the Simple_Majority process with the friend's userId and a depth value decreased by 1. Once the locations for all the friends are extracted, aggregation of the locations, in step 9, may be performed to obtain unique locations. If the attribute of interest is location, step 10 may be performed in which boosting of concepts (e.g., a more specific or fine-grained concept is boosted by a more general concept) is achieved. For example, the state concepts boost all city concepts in which the city belongs to that state. Similarly, the country level concepts may boost the state and city level concepts. If the attribute of interest is not location, step 10 may be omitted. In step 11, the process may then return the location having the maximum frequency and that location value is assigned to the user.

FIG. 5 is example code for determining closeness between users on a social network in accordance with an illustrative embodiment, which may be implemented by the closeness process 124 of FIG. 1. Closeness amongst two people is a subjective term and may be implemented in several ways, including number of common friends, semantic relatedness between the activities (verbs) of the two users collected from the messages posted by each one of them, etc. In one embodiment, the number of common friends may be adopted as the optimum choice because of low time complexity and high accuracy. This Closeness( ) process may be used in conjunction with the identification process, k_Closest_Friends( ), described in FIG. 6 or Fuzzy_k_Closest_Friends( ), described in FIG. 7, in order to provide a closeness value (CF) used in these processes.

The Closeness(userId, friendId) process takes as input the IDs of the user and a particular friend and returns the closeness measure of this user-friend pair. In steps 2 and 3, the IDs of both, the friends of the user and friends of the friend are obtained. Next, their common friends are calculated and assigned as "CF".

If the attribute of interest is location, optional steps 5-8 may be performed to address certain cases in which the friend of a user may be a spammer or a celebrity. A spammer is typically identified by the vast difference between the number of users he is following and the number of users following him back. The Spam Ratio (SR) of a friend is defined as:

$$SR(userId) = \frac{Following(friendId)}{Follwers(friendId)}$$

$$SR(friendId) = \frac{Following(friendId)}{Follwers(friendId)}$$

If SR is found to be greater than a threshold value, $N_{spammer}$, the friend may be identified as a spammer and CF is set to 0. It may also be desirable to control the influence of celebrities in deciding the location of the user. For instance, if the friend is a celebrity, it may be desirable to decrease the influence the celebrity has over the determination of the user's location. However, it is also important to note that in certain cases, the celebrities that the user is following cam be a good bet in guessing the user's location. The closeness effect a celebrity has on a user's location is abbreviated in location-optional steps 7 and 8. If the attribute of interest is not location, steps 5-8 may be omitted.

In step 9, the process then returns the calculated. CF value.

FIG. 6 is example code for determining the location of a user using the locations of the user's closest friends on a social network in accordance with an illustrative embodiment, which may be implemented by the closest friends process 126 of FIG. 1. This process, k_Closest_Friends(userId, depth), may utilize the CF value obtained from the Closeness( ) process described in FIG. 5 to determine the location of a user from the user's social network. Although the process k_Closest_Friends is illustrated as determining the particular attribute of location from a user's Twitter social network, it should be noted that the process is not limited to such location attributes, and may be applicable to any attribute provided on any social network as previously defined.

As shown, steps 1 through 6 of the k_Closest_Friends process remain the same as that of the Simple_Majority(userId, depth) process in FIG. 4. However, in step 7 of the k_Closest_Friends process, the method k-CF (userId, All-Friends [ ], k) is called. The k-CF method returns an array consisting of userIds of the top-k closest friends of the user along with their pair wise closeness to the user, as determined from the process in FIG. 5. Note that top-k denotes the k closest friends of the user in terms of CF values, and can be obtained using an extended form of the process given in FIG. 5. The proposed extension sorts all friends of a user in descending order of CF values and returns an array consisting of the top-k friends along with their associated CF values.

As shown in step 9, for each of the k-closest friends, the location is determined by recursively calling k_Closest_Friends( ) with the friend's userId and a depth value decreased by 1. Once locations of the k-closest friends are obtained, supported by their individual closeness as determined by FIG. 5, the various location concepts may be aggregated and assigned probability scores. The location concept with the maximum or highest probability (weighted) score is returned. As an example, consider friend $F_2$ in FIG. 2. At every depth level of the graph, only the location concepts with the maximum weighted scores are selected, therefore, some location concepts will be discarded. For example, since the location of friend $F_2$ in FIG. 2 is not known, the social graph shows that the location with maximum weight is Dallas. All other locations with lesser probabilities in this example (Seattle, Sydney, etc.) are discarded, and thus friend $F_2$ may be assigned the location of Dallas. Thus, with the k-closest friends process, the location concept having the highest weight at each depth level is selected and retained, while all of the other location concepts for that depth level are discarded.

Consider another example of the k-closest friends process. The k-closest friends process uses two inputs—depth (d) and k, the number of closest friends to examine. In this example, let depth=2 and k=3. To determine the location of a user which is unknown, the process may look at the user's friends. Suppose the user has 100 friends. The process may identify the top k (3) friends of the user as John, Jerry, and Julie. The corresponding CF value (calculated in the Closeness( ) process in FIG. 5) for each of them, is 15, 5 and 5, respectively. Thus, a table of this information shows:

| User  | CF | Location |
|-------|----|----------|
| John  | 15 | Unknown  |
| Jerry | 5  | Plano    |
| Julie | 5  | Dallas   |

Since the process has just examined the user's immediate friends, the examined level is depth=1. As maxDepth=2 and John's location is not known, the process may further examine John's friends by recursively calling k_Closest_Friends( ) with John's userId and decreasing the depth value by 1.

Now the process may find John's top friends and each of their locations, as shown in the following table:

| User    | CF | Location |
|---------|----|----------|
| Mark    | 10 | Unknown  |
| Michael | 15 | Austin   |
| Mary    | 10 | Dallas   |

Although the location of one of John's friend's (Mark) is not known, since this is depth=2 (=maxDepth), the process cannot proceed further. At this point, the k-closest process determines that John's location is Austin. This determination is made because for John's top friends, Mark, Michael, and Mary, the location Austin has a CF of 15, Dallas has a CF of 10, and the third location is unknown and thus ignored. Consequently, the locations for the user's immediate friends John, Jerry, and Julie will change to:

| User  | CF | Location |
|-------|----|----------|
| John  | 15 | Austin   |
| Jerry | 5  | Plano    |
| Julie | 5  | Dallas   |

The k-closest friends process may then determine the user's location to be Austin, since John's location outweighs the other locations.

It should be noted that if the attribute of interest is location, optional step 12 may be performed to boost the location as previously described. If the attribute of interest is not location, step 12 may be omitted.

FIG. 7 is example code for determining the location of a user along with an associated confidence level using the locations of the closest friends in the user's social network in accordance with an illustrative embodiment, which may be implemented by the fuzzy closest friends process 128 of FIG. 1. This process is referred to as Fuzzy_k_Closest_Friends. As mentioned previously, in the Simple_Majority( ) and the k_Closest_Friends( ) processes, each node in the social graph has a single value for an attribute, and at each step, the attribute values with lower scores (e.g., locations less likely to be the location of the user) are not propagated to the upper levels (e.g., levels closer to the central user) of the graph. Fuzzy_k_Closest_Friends may provide additional accuracy over the other processes in that Fuzzy_k_Closest_Friends returns the entire array of probable locations rather than a single location value, and provides an indication of the confidence level of the location information of each node. Although the process Fuzzy_k_Closest_Friends is illustrated in this particular example as determining the particular location of a user from the user's Twitter social network, it should be noted that the process is not limited to determining only locations, and may be applicable to any attribute provided, on any social network as previously defined.

In this embodiment of the invention, the Fuzzy_k_Closest_Friends process demonstrates the fact that each node of the social graph may be assigned multiple locations, each of which is associated, with a certain probability. Additionally, these labels are propagated, throughout the social network, and no locations are discarded. At each level of depth of the graph, the results may be aggregated similarly to the previous processes so as to maintain a single vector of locations with their probabilities.

The initial input to the Fuzzy_k_Closest_Friends process is the userId of the user and the maximum depth. In step 1, at any depth of recursion, the process attempts to determine the explicitly specified location for the user. If the location of the user is specified explicitly, then the location is returned with a confidence level of 1.0. Otherwise, on reaching a depth of 0, if the process is not able to find the location, the process returns a null value with a confidence level of 1.0. If the location is not specified explicitly, then the process attempts to determine the user's location on the basis of the locations of the k-closest social network friends of the user.

In step 6, a list of all friends of the user under scrutiny is obtained comprising the people the user is following and the people following the user on Twitter. Next, the method k-CF (userId, AllFriends [ ], k) described in the k_Closest_Friends process is called. In the next step, for each of the k-closest friends, a list of locations and their associated probabilities is determined by recursively calling k_Closest_Friends with the friend's userId and a depth value decreased by 1. Once all locations and probability distribution of the k-closest friends have been determined, supported by their individual closeness as determined by FIG. 5, the scores of the concepts may be aggregated as described in the Simple_Majority process in FIG. 4. The process may then return a vector of location concepts, each concept with am individual probability (weighted) score.

As an example, consider again friend $F_2$ in FIG. 2. In contrast with the Simple_Majority process in FIG. 4 and k_Closest_Friends process in FIG. 6, the Fuzzy_k_Closest_Friends( ) approach does not discard the attributes with lower confidence, and these attribute values are carried forward. Using the above scenario, the location of friend $F_2$ may be, for example, Dallas with a probability of 0.6, Seattle with a probability of 0.2, and Sydney with a probability of 0.1, etc. (the sum is always 1). To determine the location attribute value for the central user, when the process looks at the locations of the user's friends, friend $F_2$ may be "Dallas 0.6, Seattle 0.2, Sydney 0.1". Compare this array of probable locations result with the k-closest friends process, whose probable location result would be just "Dallas 0.6".

Once the central user has been reached and an array of location concepts has been obtained, the last step (Location [ ] [ ]) is used to determine the location of the user as the concept with the highest probability score. Note: This location step is performed for the central (main) user, not for any of his friends.

Consider another example of the fuzzy k-closest friends process. Using the same example scenario described in the k-closest friends process, the fuzzy k-closest friends process also uses two inputs—depth=2 and the number of closest friends to examine, k=3. To determine the location of a user which is unknown, the fuzzy k-closest friends process may perform a set of steps similar to the k-closest friends process. For instance, the user in this example has 100 friends. The process may identify the top k (3) friends of the user as John, Jerry, and Julie. The corresponding CF value (calculated in the Closeness( ) process in FIG. 5) for each of them is 15, 5 and 5, respectively, as shown below:

| User | CF | Location |
|---|---|---|
| John | 15 | Unknown |
| Jerry | 5 | Plano |
| Julie | 5 | Dallas |

Since the process has just examined the user's immediate friends, the examined level is depth=1. As maxDepth=2 and John's location is not known, the process may further examine John's friends by recursively calling k_Closest_Friends( ) with John's userId and decreasing the depth value by 1.

Now, the process may find John's top friends and each of their locations, as shown below:

| User | CF | Location |
|---|---|---|
| Mark | 10 | Unknown |
| Michael | 15 | Austin |
| Mary | 10 | Dallas |

Although the location of one of John's friend's (Mark) is not known, since this is depth=2 (=maxDepth), the process cannot proceed further. At this point, the fuzzy k-closest friends process diverges from the k-closest friends process. The fuzzy k-closest friends process may determine that, from his friends' locations, John's location is {Austin-15/25, Dallas-10/25} (the unknown location of Mark is ignored). Thus, the determination of location may be an array, and not a single value. Consequently, the locations for the user's immediate friends will change to:

| User  | CF | Location                    |
|-------|----|-----------------------------|
| John  | 15 | {Austin-15/25, Dallas-10/25}|
| Jerry | 5  | Plano                       |
| Julie | 5  | Dallas                      |

Thus, the new scores for each friend would be:
Austin: (15/25)*15 (John)=9
Dallas: (10/25)*15 (John)+5 (Julie)=11
Piano: 5 (Jerry)=5
As a result, the fuzzy k-closest friends process may determine that the user's location is Dallas, as the user is the primary user of interest and Dallas outweighs the other locations.

While both the k-closest friends and the fuzzy k-closest friends processes are recursive, in contrast with the k-closest friends process in FIG. 6, the fuzzy k-closest friends approach chooses the maximum, weighted location at the last step (for the primary user), and in the other cases (e.g., for each depth level of the user's friends), the process calculates an array of locations (e.g., as done for friend John above). The k-closest friends process selects the maximum weighted location at each depth level, and discards the other location values.

It should be noted that if the attribute of interest is location, optional step 12 may be performed to boost the location as previously described. If the attribute of interest is not location, step 12 may be omitted.

With specific regard to determining location of a user, at each step of the depth of the recursion, the Fuzzy_k_Closest_Friends process may return a vector of location concepts with their individual probabilities. Among the different concepts obtained from the social graph, there is also a null concept which originates at 0 depth when a location cannot be found. It is also important to understand that the higher the maxDepth (the maximum depth), the fewer the nodes in the upper hierarchy that are tagged null, which results in a lower score for the null concept in the final vector.

In a further embodiment of the invention, an element of Location Confidence Threshold (LCT) is introduced. The location confidence threshold serves to ensure that when a process reports the possible location of a user, it does so with some minimum level of confidence. The location confidence threshold is used in agglomerative clustering to take into account the friends who live in a nearby, albeit different city. For example, if a user's location is Dallas, Tex., the location of friends A and B is Plano, Tex., and the location of friend C is Richardson, Tex., agglomerative clustering may cluster (group) locations which are close to each other and combine their individual scores. The concepts may be combined until the location confidence threshold is crossed, at which point the clustering process may be terminated. The location confidence threshold may be defined as $$LCT(u, \text{maxDepth}) = (1 - \beta(u)^{\text{maxDepth}})$$

The location confidence threshold increases with the increasing value of maxDepth, and reaches 1 for higher values of maxDepth. Similarly, with increasing depth, the probability of null concept should also decrease and the confidence level of the result should increase. β is a constant whose value lies between 0 and 1 and depends on the social graph of the user. For example, the higher the number of immediate friends of the user that are labeled, the lower the value is for β. Until this point, little emphasis has been placed on the geospatial proximity of the different concepts. That is, the concepts are treated purely as labels, with no mutual relatedness. Since the concepts are actual geographical cities, the closely located cities and suburbs may be agglomerated in an effort to improve the confidence and thus, the accuracy of the system.

Figure 8:
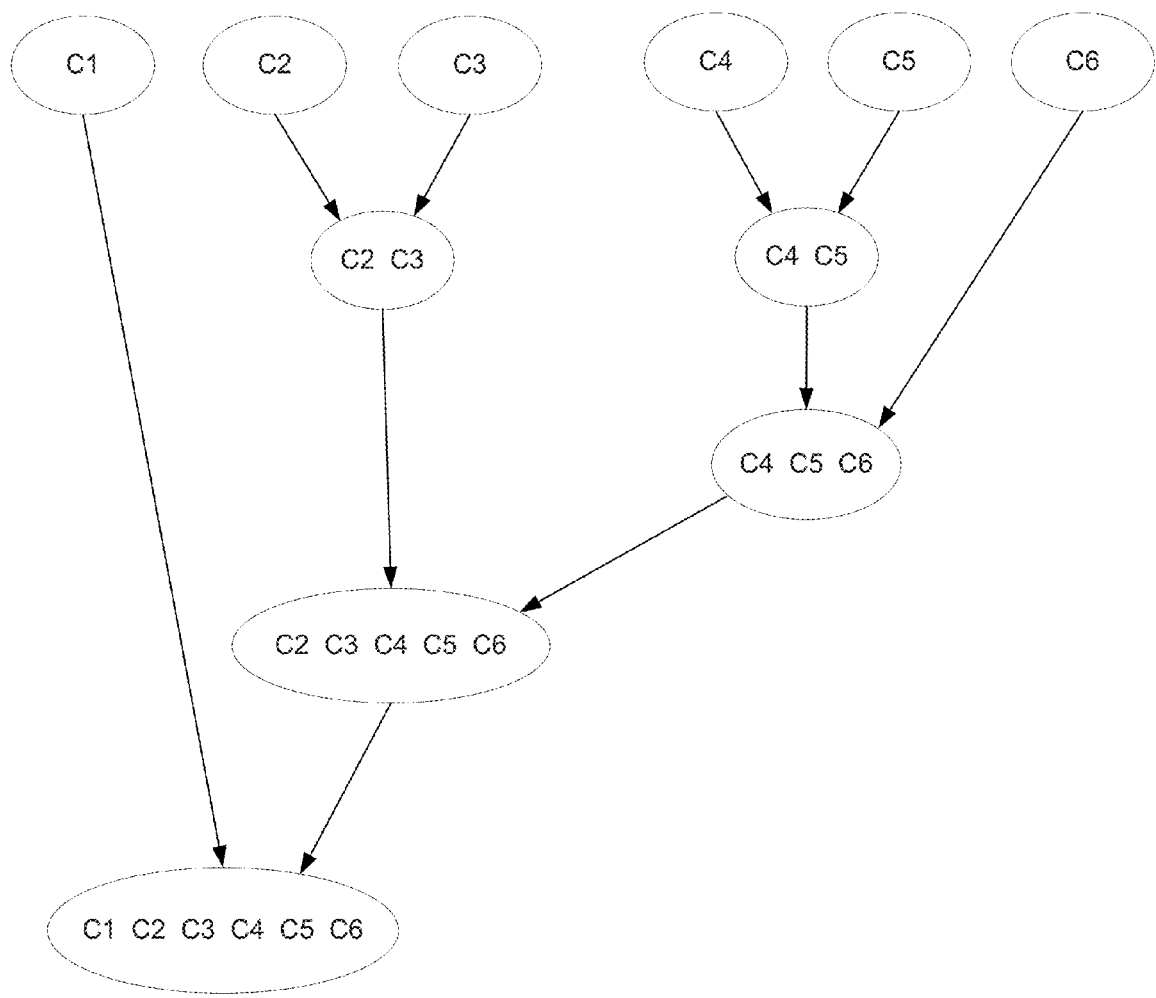
FIG. 8 is an example chart of agglomerative hierarchical clustering in accordance with am illustrative embodiment.

FIG. 8 illustrates an example of agglomerative hierarchical clustering in accordance with an illustrative embodiment. Agglomerative hierarchical clustering is applicable when determining a location for a user, and may not be applicable when determining values for other attributes of the user.

Consider p location concepts $C_1, \ldots, C_p$ where each concept has an associated probability. Initially, all concepts are presented, individually as $\{C_1\}, \{C_2\}, \ldots, \{C_p\}$. If any non-null concept has a value greater than the location confidence threshold, then the process returns that concept as the location and terminates. Otherwise, at the next step, a matrix is constructed in which the number in the i-th row j-th column is an objective function θ of the distances and cumulative scores between the i-th and j-th concepts.

$$\theta_{i,j} = e^{S/T} * d$$

where $S = S_i + S_j$, the combined score of concept clusters $C_i$ and $C_j$, d is the geographic distance between the two clusters, and T is a constant with 0<T<1.

At the first step of agglomeration, two concepts with the highest values for the objective function, θ, are combined and a check is performed to see if the new concept cluster has a combined score greater than the LCT. If not, the process is continued, constructing the matrix a gain, but this time some of the concepts are replaced by concept clusters. Thus, in the subsequent iteration, two concept clusters that have the maximum values for the objective function θ are selected. Note that the mean geographic distance between a concept cluster A and a concept cluster B is defined as $$d_{AB} = \frac{1}{|A||B|} \sum_{x \in A} \sum_{x \in B} d(x, y)$$

Thus, at any step of the agglomeration, the two concept clusters with the maximum values for the objective function θ are selected. If the score of the combined bag of concepts crosses the location confidence threshold, the bag of concepts may be returned as the possible location vector and the process is terminated.

Figure 9:
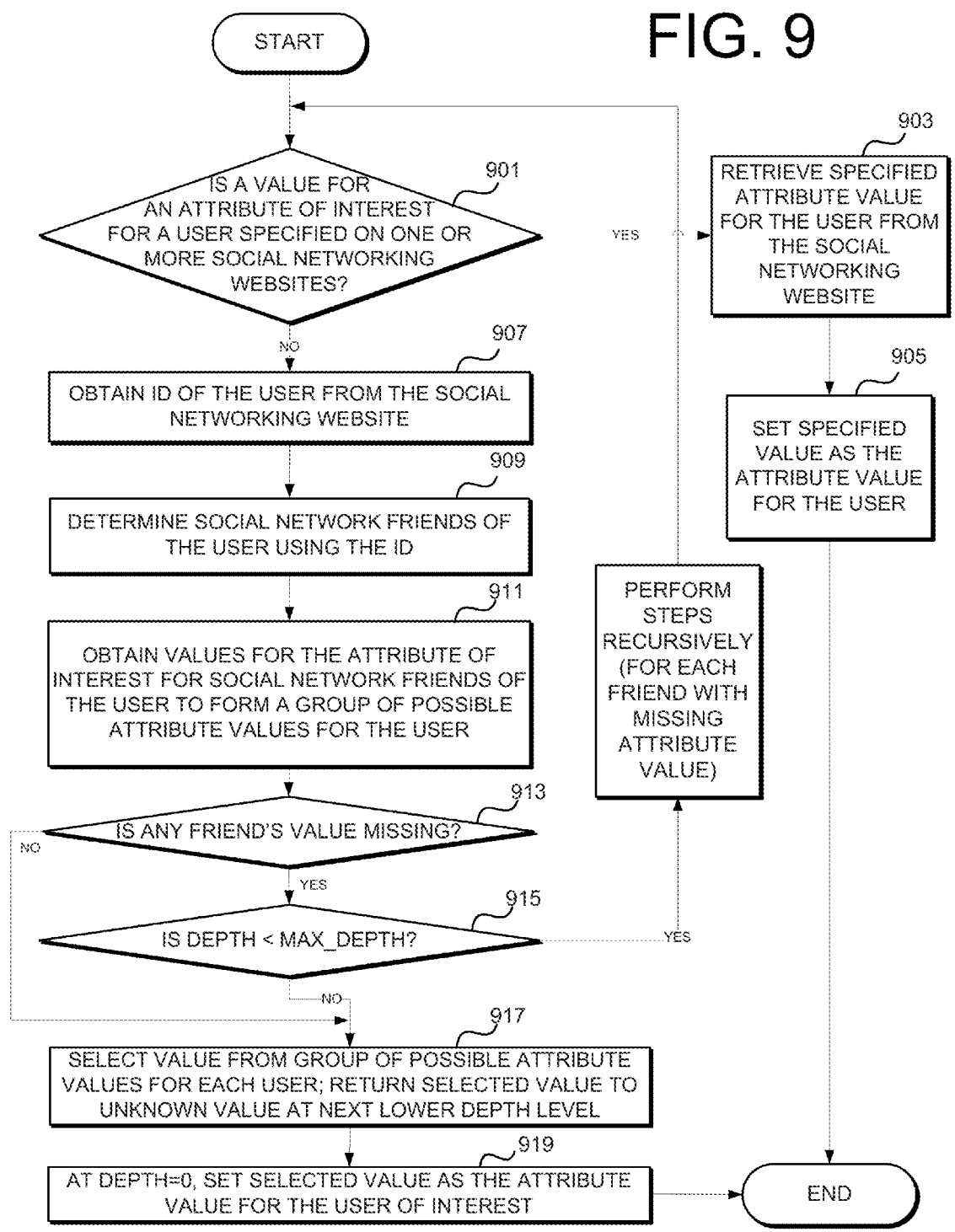
FIG. 9 is a flowchart of a process for determining the value of an attribute of a user based on the user's social network in accordance with an illustrative embodiment.

FIG. 9 is a flowchart of a process for determining the value of an attribute of a user based on the user's social network in accordance with an illustrative embodiment. The process described in FIG. 9 may be implemented by the attribute value determination system 100 in FIG. 1. This process is a recursive process.

The process begins with a determination whether the value of an attribute of a user is specified on one or more social networking websites (step 901). As previously mentioned, the attribute may be one or more of, inter alia, a location, age, age group, race, ethnicity, threat, languages spoken, religion, economic status, education level, gender, hobby, or interest of the user. If the process determines that the attribute value is specified on a social networking website, the process may retrieve the specified attribute value as the attribute value for the user from the social networking website (step 903). The process may then set the specified value as the attribute value for the user (step 905).

However, if the process determines that the attribute value is not specified for the user, the process may obtain, from a social networking website, the ID of the user (step 907). Using the userId, the process may then determine the social network friends of the user (step 909), and obtain values for the attribute of interest for friends of the user from their social networking website profiles, to form a group) of possible attribute values for the user (step 911). The process then determines if an attribute value exists for each of the social network friends of the user (step 913). If the process determines that attribute values exist for all friends of the user, the process proceeds to step 917 and selects a value from the group of possible attribute values for the user at the current depth level. In addition, the process may return the determined value to lower depth levels when the current depth level is greater than 0. Once attribute values have been selected for a user's immediate friends (depth=1), a value can be subsequently selected for the central user at depth=0. The process then sets the value selected for depth=0 as the attribute value for the primary user of interest (step 919).

However, if the process determines in step 913 that attribute values are missing for some of the user's social network friends (e.g., the user's friends have not explicitly provided values for the attribute of interest on their social networking website profiles), the process then checks whether the current depth level is less than maxDepth (step 915). If the process determines that the current depth level is less than maxDepth, the process recursively determines an attribute value for each friend with a missing value. However, if the process determines that the current depth level is not less than maxDepth, the process ignores friends with missing attribute values and selects a value for the user at the current depth level from the attribute values of the remaining friends (step 917). In addition, the selected value is returned to lower depth levels when the current depth level is greater than 0 (step 917). Once attribute values have been selected for a user's immediate friends (depth=1), a value can be subsequently selected for the central user at depth=0. The process then sets the value selected for depth=0 as the attribute value for the primary user of interest (step 919).

Figure 10:
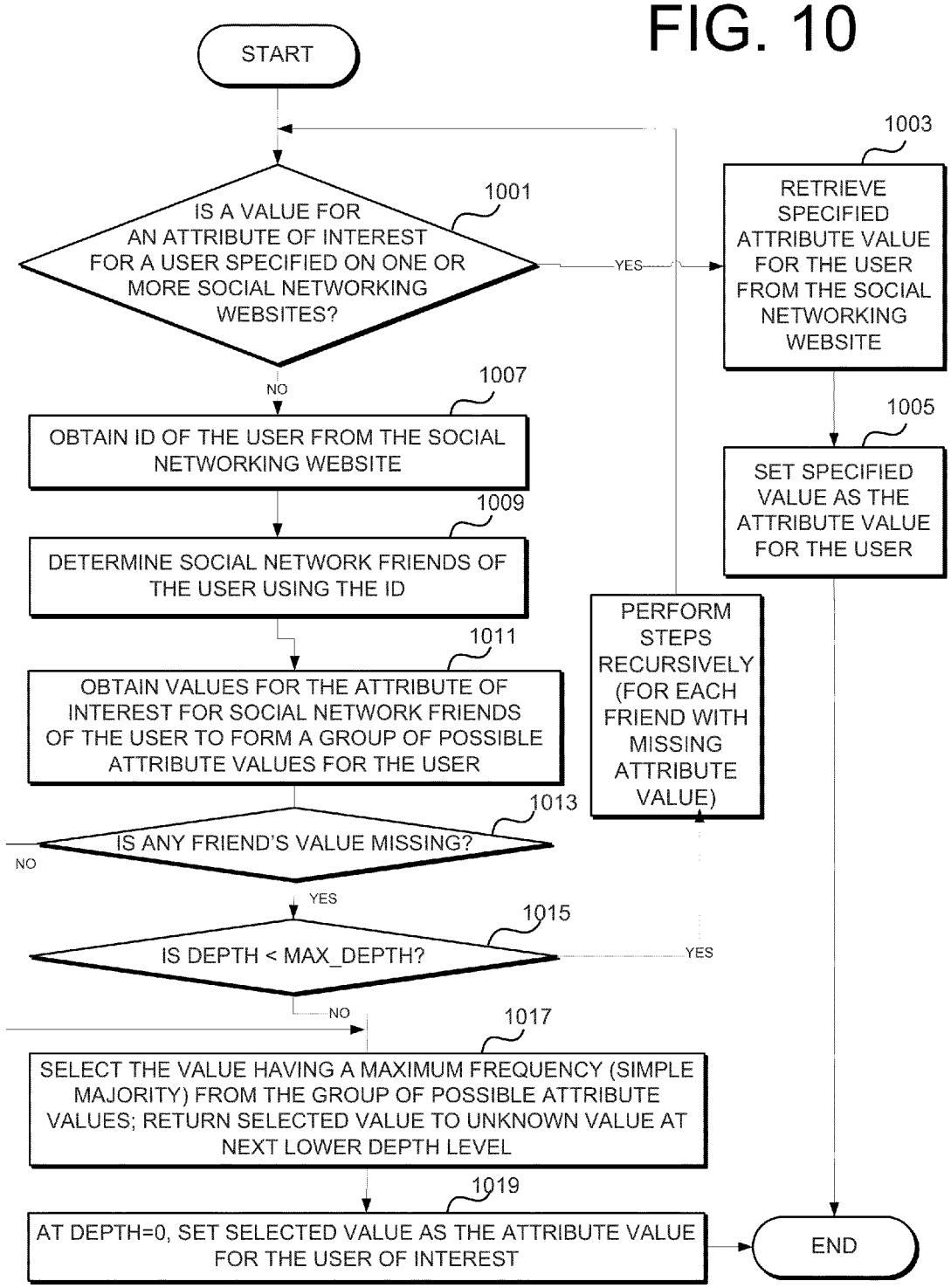
FIG. 10 is a flowchart of a process for determining the value of an attribute of a user using a simple majority of the attribute values of the user's friends on a social network in accordance with an illustrative embodiment.

FIG. 10 is a flowchart of a process for determining the value of an attribute of a user using the attribute values of a simple majority of the user's social network in accordance with an illustrative embodiment. The process described in FIG. 10 may be implemented by the attribute value determination system 100 in FIG. 1. This process is a recursive process.

The process begins with a determination whether the value of an attribute of interest for a user is specified on one or more social networking websites (step 1001). If the process determines that the attribute value is specified on a social networking website, the process may retrieve the specified attribute value as the attribute value of the user from the social networking website (step 1003). The process may then set the specified value as the attribute value for the user (step 1005).

However, if the process determines that the attribute value is not specified for the user, the process may obtain, from a social networking website, the ID of the user (step 1007). Using the userId, the process may then determine the social network friends of the user (step 1009), and obtain values for the attribute of interest for social network friends of the user from their social networking website profiles, to form a group of possible attribute values for the user (step 1011). The process then determines if an attribute value exists for each of the social network friends of the user (step 1013). If the process determines that attribute values exist for all friends of the user, the process proceeds to step 1017 and selects the value having the maximum frequency among the friends of the user for the current depth level. The maximum frequency comprises a simple majority of the attribute values retrieved for the friends of the user. For example, if the attribute is location and the majority of the user's social connections (friends) have a location value of Dallas, Tex., USA, the process will select this location as the location having the maximum frequency among the user's social connections, and set this location value as the user's location for the current depth level. In addition, the process may return the determined value to lower depth levels when the current depth level is greater than 0 (step 1017). Once attribute values have been selected for a user's immediate friends (depth=1), a value can be subsequently selected for the central user at depth=0. The process then sets the value selected for depth=0 as the attribute value for the primary user of interest (step 1019).

However, if the process determines in step 1013 that attribute values are missing for some of the user's social network friends (e.g., the user's friends have not explicitly provided values for the attribute of interest on their social networking website profiles), the process then checks whether the current depth level is less than maxDepth (step 1015). If the process determines that the current depth level is less than maxDepth, the process recursively determines an attribute value for each friend with a missing value. However, if the process determines that the current depth level is not less than maxDepth, the process ignores friends with missing attribute values and selects a value for the user at the current depth level from the attribute values of the remaining friends, and the selected value is returned to lower depth levels when the current depth level is greater than 0 (step 1017). Once attribute values have been selected for a user's immediate friends (depth=1), a value can be subsequently selected for the central user at depth=0. The process then sets the value selected for depth=0 as the attribute value for the primary user of interest (step 1019).

Figure 11:
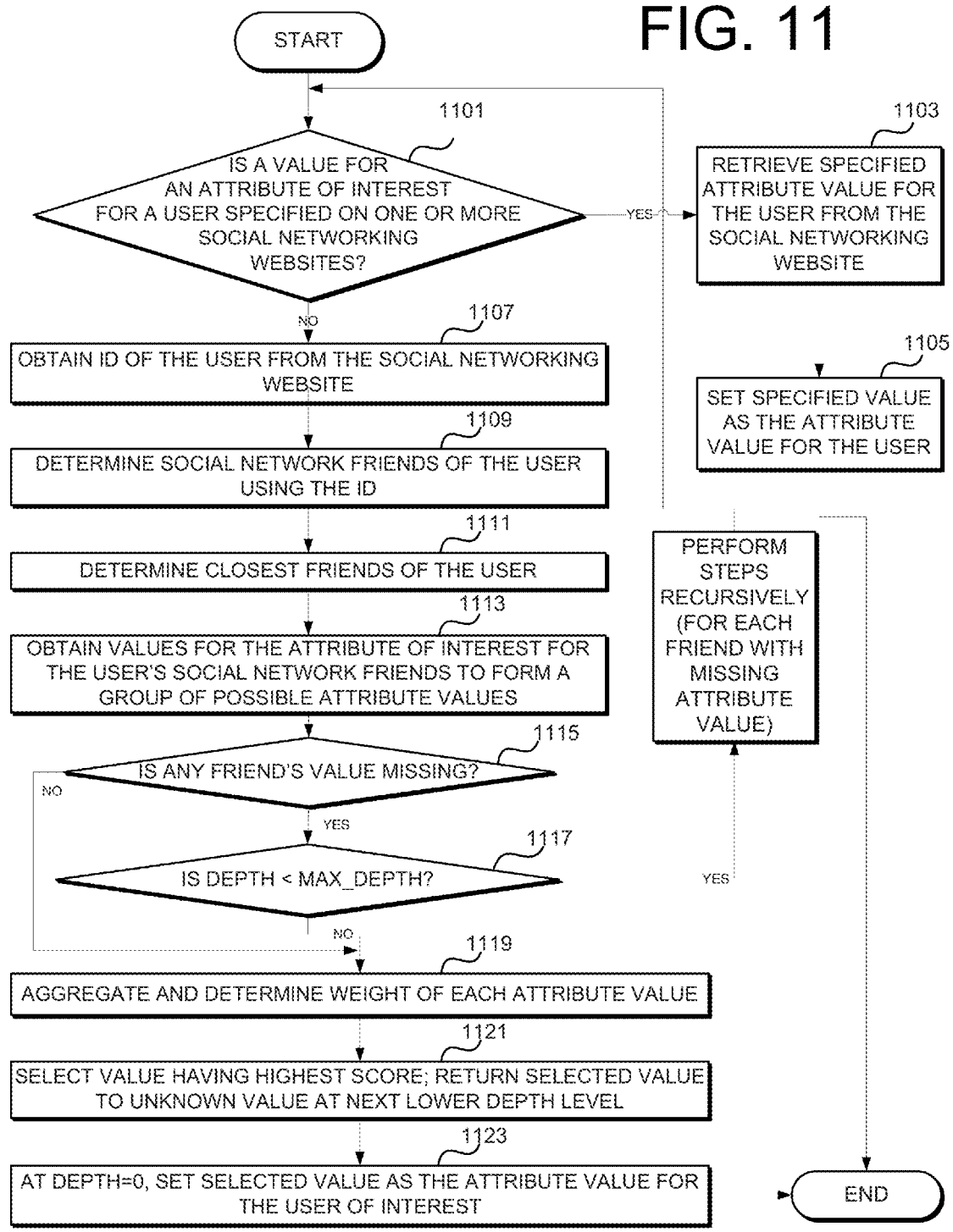
FIG. 11 is a flowchart of a process for determining the value of an attribute of a user using attribute values of the closest friends in the user's social network in accordance with an illustrative embodiment.

FIG. 11 is a flowchart of a process for determining the value of an attribute of a user using the attribute values of the closest friends in the user's social network in accordance with an illustrative embodiment. The process described in FIG. 11 may be implemented by the attribute value determination system 100 in FIG. 1. This process is a recursive process.

The process begins with a determination whether the value of an attribute of interest for a user is specified on one or more social networking websites (step 1101). If the process determines that the attribute value is specified on a social networking website, the process may retrieve the specified attribute value as the attribute value for the user from the social networking website (step 1103). The process may then set the specified value as the attribute value for the user (step 1105).

However, if the process determines that the attribute value is not specified for the user, the process may obtain, from a social networking website, the ID of the user (step 1107). Using the userId, the process may then determine the social network friends of the user (step 1109) and then determine which friends are the closest friends of the user (step 1111).

For each of the user's closest friends, the process obtains values for the attribute of interest from their social networking website profiles (step 1113). Once the attribute values for the closest friends have been obtained, the process then determines if an attribute value exists for each of the social network friends of the user (step 1115). If the process determines that attribute values exist for all friends of the user, the process proceeds to step 1119 where the attribute values are aggregated and weighted. The attribute values are weighted to reflect that some friends are "closer" to the user and should have more influence on the attribute determination. A numeric value is used to reflect this closeness or influence as described in FIG. 5. Thus, for example, when determining a user's location, one may look at the user's friends. If the user and friend A have 10 mutual friends, then the weight given to friend A's location (Dallas) is 10. If the user and friend B have 5 mutual friends, then the weight given to friend B's location (Piano) is 5, and so on. The weights for Dallas, Plano, etc. may each be combined or aggregated to form a weighted score for each location. The process then selects the value having the highest weighted score as the attribute value for the user at the current depth level, and may return the determined, value to lower depth levels when the current depth level is greater than 0 (step 1121). Once attribute values have been selected for a user's immediate friends (depth=1), a value can be subsequently selected for the central user at depth=0. The process then sets the value selected for depth=0 as the attribute value for the primary user of interest (step 1123).

However, if the process determines that attribute values are missing for some of the user's social network friends at step 1115 (e.g., the user's friends have not explicitly provided values for the attribute of interest on their social networking website profiles), the process then checks whether the current depth level is less than maxDepth (step 1117). If the process determines that the current depth level is less than maxDepth, the process recursively determines an attribute value for each friend with a missing value. However, if the process determines that the current depth level is not less than maxDepth, the process ignores friends with missing attribute values and aggregates and weights the attribute values of the remaining friends (step 1119). The process then selects the value having the highest, weighted score as the attribute value for the user at the current depth level, and may return the determined, value to lower depth levels when the current depth level is greater than 0 (step 1121). Once attribute values have been selected for a user's immediate friends (depth=1), a value can be subsequently selected for the central user at depth=0. The process then sets the value selected for depth=0 as the attribute value for the primary user of interest (step 1123).

Figure 12:
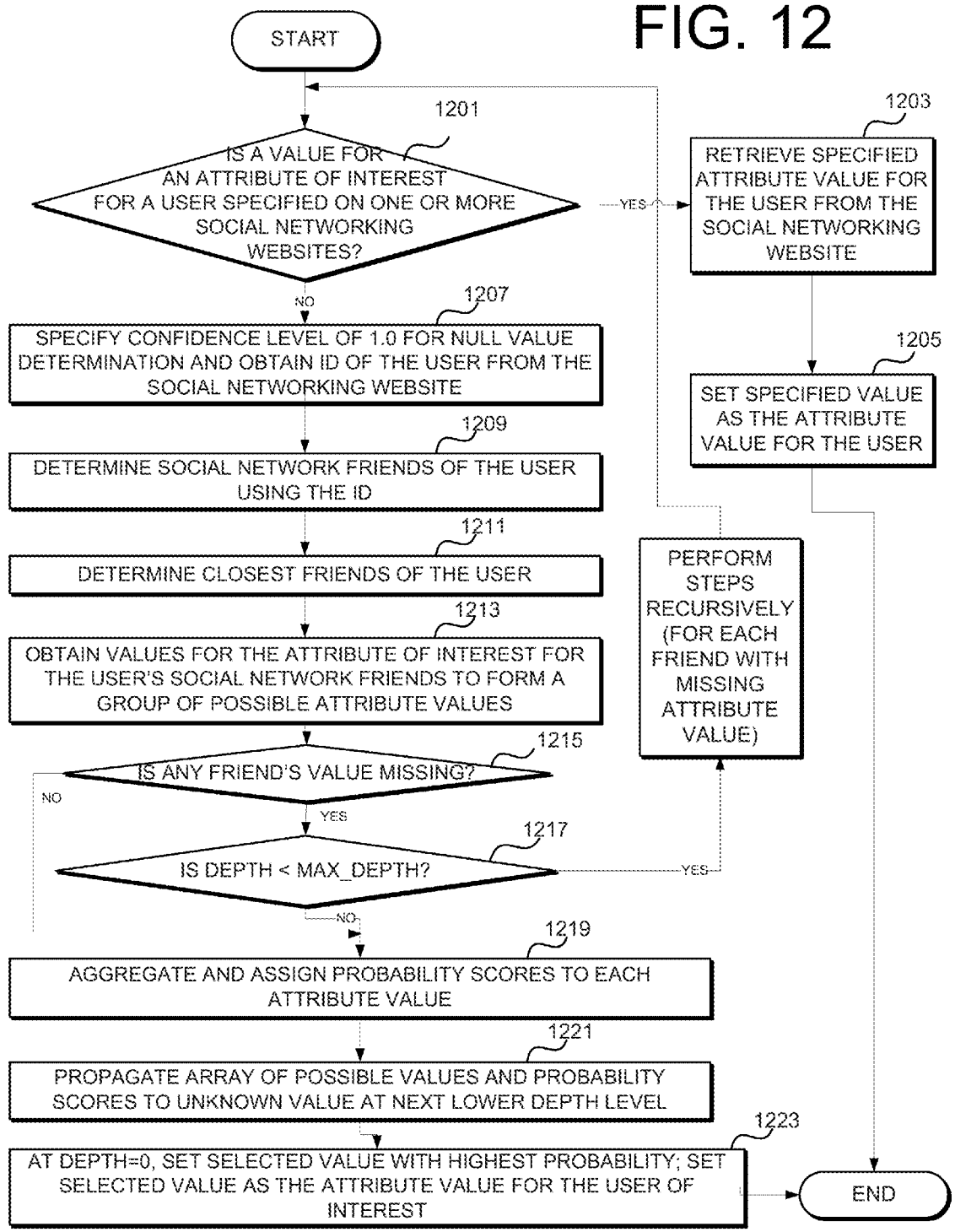
FIG. 12 is a flowchart of a process for determining the value of an attribute of a user along with an associated confidence level using attribute values of the closest friends in the user's social network in accordance with the illustrative embodiment.

FIG. 12 is a flowchart of a process for determining the value of an attribute of a user along with an associated confidence level using the attribute values of the closest friends in the user's social network in accordance with the illustrative embodiment. The process described in FIG. 12 may be implemented by the attribute value determination system 100 in FIG. 1. This process is a recursive process.

The process begins with a determination whether the value of an attribute of interest for a user is specified on one or more social networking websites (step 1201). If the process determines that the attribute value is specified on a social networking website, the process may retrieve the specified, attribute value as the attribute value for the user from, the social networking website (step 1203). The process may then set the specified value as the attribute value for the user (step 1205).

However, if the process determines that the attribute value is not specified for the user, the process may obtain, from a social networking website, the ID of the user and, for the null value determination, specify a confidence level of 1.0 (step 1207). Using the userId, the process may then determine the social network friends of the user (step 1209) and then determine which friends are the closest friends of the user (step 1211).

For each of the user's closest friends, the process obtains values for the attribute of interest from their social networking website profiles (step 1213). Once the attribute values for the closest friends have been obtained, the process then determines if am attribute value exists for each of the social network friends of the user (step 1215). If the process determines that, attribute values exist for all friends of the user, the process proceeds to step 1219 where the attribute values are aggregated, and assigned a probability score, and the array of values is propagated to the next lower depth level (step 1221). This array of values and associated probability scores are used to determine the unknown value at the next lower depth level. Once attribute value arrays have been obtained for a user's immediate friends (depth=1), the value with the highest, probability score is selected as the attribute value for the central user at depth=0, and the value selected for depth=0 is set as the attribute value for the primary user of interest (step 1223).

However, if the process determines that attribute values are missing for some of the user's social network friends (e.g., the user's friends have not explicitly provided values for the attribute of interest on their social networking website profiles), the process then checks whether the current depth level is less than maxDepth (step 1217). If the process determines that the current depth level is less than maxDepth, the process recursively determines am array of attribute values with their associated probabilities for each friend with a missing value. However, if the process determines that the current depth level is not less than maxDepth, the process ignores friends with missing attribute values and aggregates and assigns probability scores to each of the attribute values of the remaining friends (step 1219). The process also propagates the array of values to the next lower depth level (step 1221). This array of values and associated probability scores are used to determine the unknown value at the next lower depth level. Once attribute value arrays have been obtained for a user's immediate friends (depth=1), the value with the highest probability score is selected as the attribute value for the central user at depth=0, and the value selected for depth=0 is set as the attribute value for the primary user of interest (step 1223).

Figure 13:
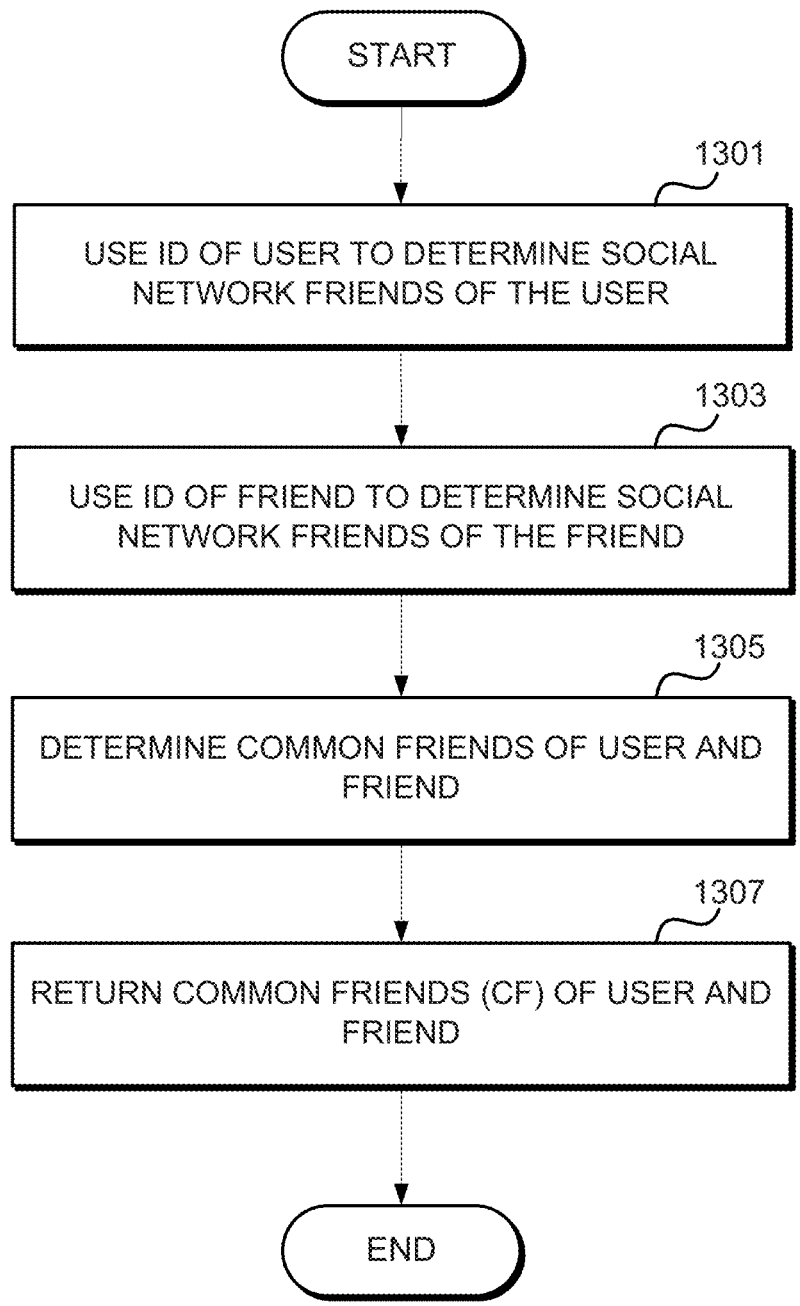
FIG. 13 is a flowchart of a process for determining closeness between users on a social network in accordance with an illustrative embodiment.

FIG. 13 is a flowchart of a process for determining closeness between users on a social network in accordance with an illustrative embodiment. The process described in FIG. 13 may be implemented by the attribute value determination system 100 in FIG. 1.

The process may, using the ID of the user, determine the social network friends of the user (step 1301). The process may also obtain, using the ID of a particular friend of the user, the friends of that friend (step 1303). A determination is then made by the process as to the common friends between the user and the user's friend (step 1305). The process may then return the determined common friends (CF) between the user and the particular friend (step 1307).

Figure 14:
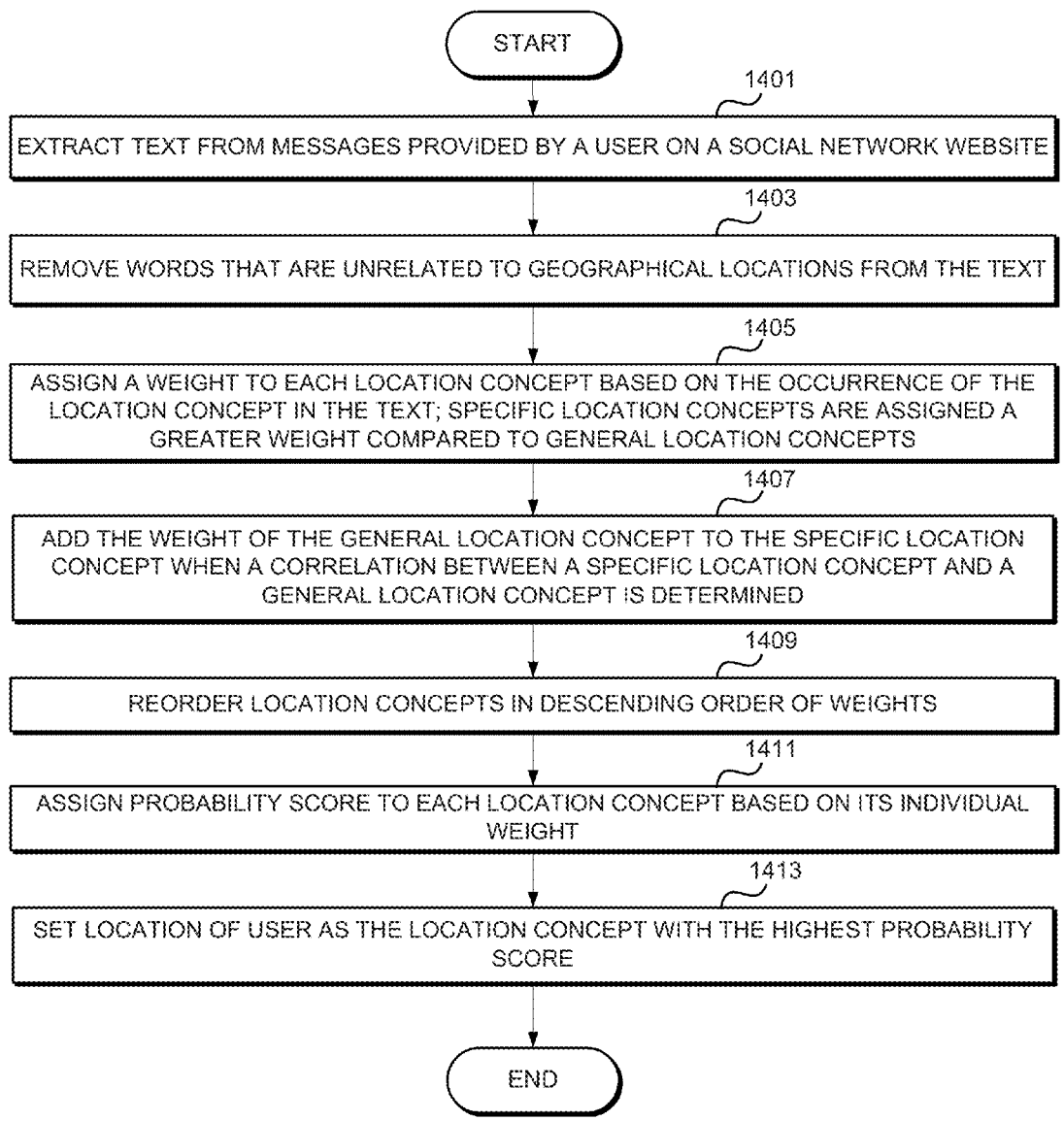
FIG. 14 is a flowchart of another process for determining a location of a user from social network messages using a gazetteer in accordance with the illustrative embodiment.

FIG. 14 is a flowchart of another process for determining the location of a user from social network messages using a gazetteer in accordance with the illustrative embodiment. The process described in FIG. 14 may be implemented by the attribute value determination system 100 in FIG. 1.

The process begins by extracting text from messages provided by a user on a social networking website, wherein the messages include one or more location concepts (step 1401). Words that are unrelated to geographical locations are removed from the text (step 1403). The process assigns a weight to each location concept based on the occurrence of that location concept in the text, wherein more specific or fine-grained location concepts are assigned a greater weight compared to more general location concepts (step 1405). Responsive to determining a correlation between a fine-grained location concept and a more general location concept, the process adds the weight of the more general location concept to the fine-grained location concept (step 1407). The process then reorders the location concepts in descending order of weights (step 1409), and assigns a probability score (S) to each location concept (C) based on its individual weight (step 1411). The process assigns the location concept with the highest probability score to the user (step 1413).

It will be understood that each block of the flowchart illustrations, and combinations of blocks in the flowchart illustrations, can be implemented by computer program instructions. These computer program instructions may be provided to a processor or other programmable data processing apparatus to produce a machine, such that the instructions which execute on the processor or other programmable data processing apparatus create means for implementing the functions specified in the flowchart block or blocks. These computer program instructions may also be stored in a computer-readable memory or storage medium that can direct a processor or other programmable data processing apparatus to function in a particular manner, such that the instructions stored in the computer-readable memory or storage medium produce an article of manufacture including instruction means which implement the functions specified in the flowchart block or blocks.

The flowcharts and block diagrams in the different depicted embodiments illustrate the architecture, functionality, and operation of some possible implementations of apparatus, methods and computer program products. In this regard, each block in the flowchart or block diagrams may represent a module, segment, or portion of code, which comprises one or more executable instructions for implementing the specified function or functions. In some alternative implementations, the function or functions noted in the block may occur out of the order noted in the Figures. For example, in some cases, two blocks shown in succession may be executed substantially concurrently, or the blocks may sometimes be executed in the reverse order, depending upon the functionality involved.

Figure 15:
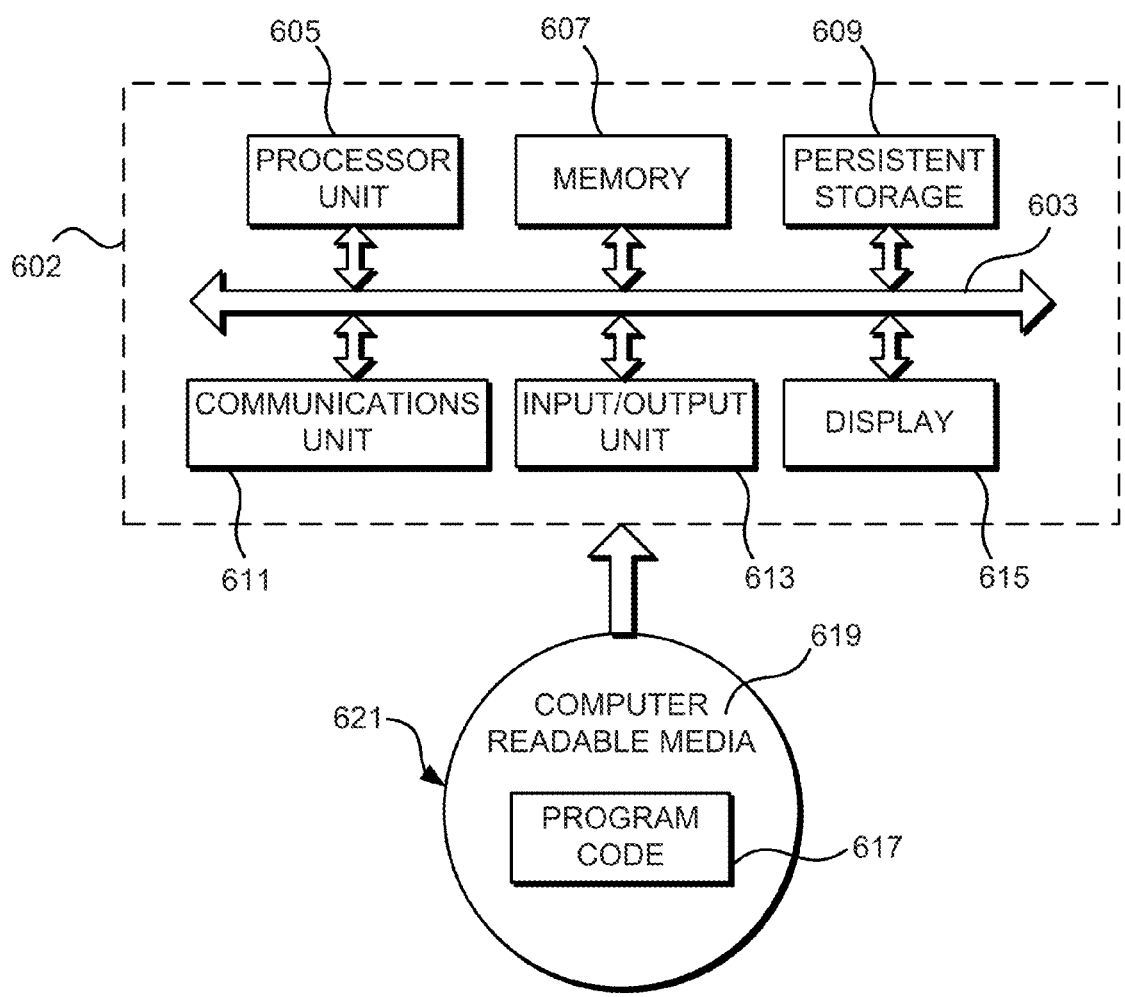
FIG. 15 is a block diagram of a computing device with which the illustrative embodiments may be implemented.

Referring to FIG. 15, a block diagram of a computing device 602 is shown in which the illustrative embodiments may be implemented. In particular, the determination of attribute values for a user using the user's social network profiles, as described in any of the illustrative embodiments, may be implemented on the computing device 602. Computer-usable program code or instructions implementing the processes used in the illustrative embodiments may be located on the computing device 602. The computing device 602 includes a communications fabric 603, which provides communication between a processor unit 605, a memory 607, a persistent storage 609, a communications unit 611, an input/output (I/O) unit 613, and a display 615.

The processor unit 605 serves to execute instructions for software that may be loaded onto the memory 607. The processor unit 605 may be a set of one or more processors or may be a multi-core processor, depending on the particular implementation. Further, the processor unit 605 may be implemented using one or more heterogeneous processor systems in which a main processor is present with secondary processors on a single chip. As another illustrative example, the processor unit 605 may be a symmetric multi-processor system containing multiple processors of the same type.

The memory 607, in these examples, may be, for example, a random access memory or any other suitable volatile or non-volatile storage device. The persistent storage 609 may take various forms depending on the particular implementation. For example, the persistent storage 609 may contain one or more components or devices. For example, the persistent storage 609 may be a hard drive, a flash memory, a rewritable optical disk, a rewritable magnetic tape, or some combination of the above. The media used by the persistent storage 609 may also be removable. For example, a removable hard drive may be used for the persistent storage 609.

The communications unit 611, in these examples, provides communication with other data processing systems or communication devices. In these examples, the communications unit 611 may be a network interface card. The communications unit 611 may provide communication through the use of either or both, physical and wireless communication links.

The input/output unit 613 allows transferring data from/to other devices that may be connected to the computing device 602. For example, the input/output unit 613 may provide a connection for user input through a keyboard and mouse. Further, the input/output unit 613 may send output to a processing device. The display 615 provides a mechanism, to display information to a user, such as a graphical user interface.

Instructions for the operating system and applications or programs are located on the persistent storage 609. These instructions may be loaded onto the memory 607 for execution by the processor unit 605. The processes of the different embodiments may be performed by the processor unit 605 using computer-implemented instructions, which, may be located in a memory, such as the memory 607. These instructions are referred to as program code, computer-usable program code, or computer-readable program code that may be read and executed by a processor in the processor unit 605. The program code in the different embodiments may be embodied on different physical or tangible computer-readable media, such as the memory 607 or the persistent storage 609.

Program code 617 is located in a functional form on a computer-readable media 619 and may be loaded onto or transferred to the computing device 602 for execution by the processor unit 605. The program code 617 and the computer-readable media 619 form computer program product 621 in these examples. In one embodiment, the computer program product 621 is the user attribute value determination system 100 described in any of the illustrative embodiments. In this embodiment, the program code 617 may include computer-usable program code capable of determining attribute values of a user using the user's social network profiles, as described in any of the illustrative embodiments herein. Indeed, any combination of the processes described in the illustrative embodiments may be implemented in the program code 617.

In one example, the computer-readable media 619 may be in a tangible form, such as, for example, an optical or magnetic disc that is inserted or placed into a drive or other device that is part of the persistent storage 609 for transfer onto a storage device, such as a hard drive that is part of the persistent storage 609. In a tangible form, the computer-readable media 619 also may take the form of a persistent storage medium, such as a hard drive or a flash memory that is connected to the computing device 602. The tangible form of the computer-readable media 619 is also referred to as computer recordable storage media.

Alternatively, the program code 617 may be transferred to the computing device 602 from the computer-readable media 619 through a communication link to the communications unit 611 or through a connection to the input/output unit 613. The communication link or the connection may be physical or wireless in the illustrative examples. The computer-readable media 619 may also take the form of non-tangible media, such as communication links or wireless transmissions containing the program code 617. In one embodiment, the program code 617 is delivered to the computing device 602 over the Internet.

The different components illustrated for the computing device 602 are not meant to provide architectural limitations to the manner in which different embodiments may be implemented. The different illustrative embodiments may be implemented in a data processing system including components in addition to or in place of those illustrated, for computing device 602. Other components shown in FIG. 15 can be varied from the illustrative examples shown.

As one example, a storage device in the computing device 602 is any hardware apparatus that may store data. The memory 607, the persistent storage 609, and the computer-readable media 619 are examples of storage devices in a tangible form.

In another example, a bus system may be used to implement the communications fabric 603 and may comprise of one or more buses, such as a system bus or an input/output bus. Of course, the bus system may be implemented using any suitable type of architecture that provides for a transfer of data between different, components or devices attached to the bus system. Additionally, the communications unit 611 may include one or more devices used, to transmit and receive data, such as a modem or a network adapter. Further, a memory may be, for example, the memory 607 or a cache such as found in an interface and memory controller hub that may be present in the communications fabric 603.

Although the illustrative embodiments described, herein have been disclosed in the context of certain illustrative, non-limiting embodiments, it should be understood that various changes, substitutions, permutations, and alterations can be made without departing from the scope of the invention as defined by the appended claims. It will be appreciated that any feature that is described in connection to any one embodiment may also be applicable to any other embodiment.

What is claimed is:

1. A method for determining a value of an attribute of a user, comprising:
   a processor in the data processing system determining if the value of the attribute of interest for the user is specified on one or more social networking websites;
   responsive to a determination that the value of an attribute of the user is not specified, the processor obtaining, from the one or more social networking websites, attribute values for the attribute of interest for friends of the user to form a group of possible attribute values for the user, each of the possible attribute values associated with a concept;
   the processor assigning a weight to each of the possible attribute values based on a specificity of each of the possible attribute values, wherein the specificity is based on a number of words in each of the possible attribute values;
   the processor selecting a value from the group of possible attribute values based on the weight; and
   the processor setting the selected value as the value of the attribute for interest for the user.

2. The method of claim 1, further comprising:
   responsive to a determination that the value of the attribute of the user is specified, the processor retrieving and setting a specified value as the value of the attribute of interest for the user.

3. The method of claim 1, wherein the attribute of interest for the user comprises one or more of a location, age, age group, race, ethnicity, threat, languages spoken, religion, economic status, education level, gender, hobby, or interest.

4. The method of claim 1, wherein the processor determining if a value of an attribute of interest for the user is specified on one or more social networking websites further comprises:
   the processor obtaining an identifier of the user from a social network profile of the user; and
   the processor obtaining the value of the attribute of interest for the user, if specified, using the identifier of the user.

5. The method of claim 1, wherein the processor obtaining the attribute values corresponding to the attribute of interest for the friends of the user to form the group of possible attribute values for the user comprises:
   the processor obtaining a user identifier for each of the friends of the user from their social network profiles; and
   the processor obtaining the attribute values for the friends, if specified on the one or more social networking websites, using the user identifier of each friend.

6. The method of claim 1, wherein the processor selecting the value from the group of possible attribute values comprises:
   the processor selecting the value having a maximum frequency among the friends of the user.

7. The method of claim 1, wherein the processor selecting the value from the group of possible attribute values comprises:
   the processor determining a set of closest friends of the user;
   the processor obtaining a value for the attribute of interest for each friend in the set of closest friends;
   the processor aggregating and determining a weight for each obtained value; and
   the processor selecting the value, from the obtained values for the set of closest friends, having a highest weighted score.

8. The method of claim 7, wherein the processor determining a set of closest friends of the user further comprises:
   the processor determining a number of friends in common between the user and each friend of the user; and
   the processor determining the set of closest friends based on the number of friends in common between the user and each friend.

9. The method of claim 8, further comprising:
   the processor determining a friend of the user is a spammer if a difference between a number of users the spammer follows and a number of users following the spammer is equal to or greater than a threshold; and
   responsive to determining the friend of the user is a spammer, the processor setting the number of friends in common between the user and the friend to zero (0).

10. The method of claim 1, wherein the processor selecting the value from the group of possible attribute values further comprises:
    the processor determining a set of closest friends of the user;
    the processor obtaining a value for the attribute of interest for each friend in the set of closest friends, wherein the obtained values are stored as an array and wherein each obtained value in the array is associated with a probability score; and
    the processor selecting the value from the array of values having a highest calculated score among the set of closest friends.

11. The method of claim 10, wherein the attribute is a location, and further comprising:
    combining two concepts, wherein each concept represents a location;
    the processor assigning one or more weights to each concept;
    the processor calculating a weight score for each concept based on the weights of each concept; and
    wherein the combining, assigning, and calculating steps are repeated until a determination is made that the combined concepts have a weight score greater than a location confidence threshold (LCT).

12. The method according to claim 11, wherein the combined concepts represent a potential location vector.

13. The method of claim 1, wherein the value of the attribute of interest for the user is specified on a publicly available profile of the one or more social networking websites.

14. A method in a data processing system for determining a location of a user, comprising:
- extracting text from messages provided by a user on a social networking website, wherein the messages include one or more location concepts;
- removing words unrelated to geographical locations from the text;
- assigning a weight to each location concept based on the occurrence of the location concept in the text, wherein specific location concepts are assigned a greater weight compared to general location concepts;
- responsive to determining a correlation between a specific location concept and a general location concept, adding the weight of the general location concept to the specific location concept;
- reordering the location concepts in descending order of weights;
- assigning a probability score (S) to each location concept (C) based on its individual weight; and
- based on the probability scores, assigning a location concept to the user.

15. The method of claim 14, wherein the location concept comprises a specified geographical location and is of the format {City}/{State}/{Country}.

16. The method of claim 15, wherein a value of one or more of the City, the State, or the Country is null.

17. An apparatus for determining a value of an attribute of a user, comprising:
- a bus;
- a storage device connected to the bus, wherein the storage device contains computer usable code; and
- a processing unit connected to the bus, wherein the processing unit executes the computer usable code to:
  - determine if a value of an attribute of interest for a user is specified on one or more social, networking websites;
  - obtain, from the social networking websites, attribute values for the attribute of interest for direct connections of the user to form a group of possible attribute values for the user in response to a determination that the value of the attribute of the user is not specified, wherein the direct connections of the user are friends of the user;
  - obtain, from the social networking websites, attribute values for the attribute of interest for indirect connections of the user to form the group of possible attribute values for the user in response to a determination that the attribute value of one of the direct connections of the user is not specified, wherein the indirect connections of the user are only linked to the one of the direct connections of the user;
  - select a value from the group of possible attribute values; and
  - set the selected value as the value of the attribute of interest for the user.

18. The apparatus of claim 17, wherein the selection of the value from the group of-possible attribute values further comprises a selection of the value from the group of possible attribute values having a maximum frequency among the direct connections and indirect connections of the user.

19. The apparatus of claim 17, wherein the selection of value from the group of possible attribute values further comprises:
- a determination of a number of friends in common between the user and each friend of the user;
- a determination of a set of closest friends based on the number of friends in common between the user and each friend;
- obtaining a value for the attribute of interest for each friend in the set of closest friends;
- aggregating and determining a weight for each obtained value; and
- a selection of a value from the obtained values having a highest weighted score among the set of-closest friends.

20. The apparatus of claim 17, the selection of value from the group of possible attribute values further comprises:
- a determination of a number of friends in common between the user and each friend of the user;
- a determination of a set of closest friends based on the number of friends in common between the user and each friend;
- obtaining a value for the attribute of interest for each friend in the set of closest friends, wherein the obtained, values comprise an array of values, and wherein each value in the array is associated with a probability score; and
- a selection of a value from the array of values having a highest calculated score among the set of closest friends.

* * * * *